US009182208B2

(12) United States Patent
Ebisawa

(10) Patent No.: US 9,182,208 B2
(45) Date of Patent: Nov. 10, 2015

(54) METHOD OF SELECTING KIND OF SIZE OF A HELMET AND SHAPE OF A PAD, METHOD OF ADJUSTING HELMET SIZE BY USING THE SELECTION METHOD, AND HEAD SIZE MEASURING TOOL USED IN AFORESAID SELECTION METHOD

(71) Applicant: Shoei Co., Ltd., Tokyo (JP)

(72) Inventor: Takashi Ebisawa, Tokyo (JP)

(73) Assignee: SHOEI CO., LTD., Tokyo (JP)

( * ) Notice: Subject to any disclaimer, the term of this patent is extended or adjusted under 35 U.S.C. 154(b) by 500 days.

(21) Appl. No.: 13/709,428

(22) Filed: Dec. 10, 2012

(65) Prior Publication Data

US 2013/0158949 A1   Jun. 20, 2013

(30) Foreign Application Priority Data

Dec. 19, 2011   (JP) ................................. 2011-276947

(51) Int. Cl.
*G01B 3/00* (2006.01)
*A42B 3/12* (2006.01)
*A42C 2/00* (2006.01)
*G06F 17/00* (2006.01)
*A41H 1/02* (2006.01)

(52) U.S. Cl.
CPC . *G01B 3/00* (2013.01); *A42B 3/127* (2013.01); *A42C 2/007* (2013.01); *G06F 17/00* (2013.01); *A41H 1/02* (2013.01)

(58) Field of Classification Search
CPC ........................................................ G01B 3/00
USPC .......................................................... 702/157
See application file for complete search history.

(56) References Cited

U.S. PATENT DOCUMENTS

| | | | |
|---|---|---|---|
| 3,882,546 A | 5/1975 | Morton | |
| 4,809,690 A | 3/1989 | Bouyssi et al. | |
| 5,056,162 A | 10/1991 | Tirums | |
| 5,324,460 A | 6/1994 | Briggs | |
| 5,891,372 A | 4/1999 | Besset et al. | |
| 6,928,385 B2 * | 8/2005 | Ebisawa .................... | 702/155 |
| 2003/0050866 A1 | 3/2003 | Fujioka | |
| 2004/0204904 A1 | 10/2004 | Ebisawa | |
| 2006/0101559 A1 | 5/2006 | Moore, III et al. | |
| 2011/0203038 A1 | 8/2011 | Jones, Jr. | |

FOREIGN PATENT DOCUMENTS

| | | |
|---|---|---|
| EP | 2404518 A2 | 6/2011 |
| FR | 2539010 A1 | 7/1984 |
| NL | 2003713 | 10/2009 |

* cited by examiner

*Primary Examiner* — Bryan Bui
(74) *Attorney, Agent, or Firm* — Jones Day

(57) ABSTRACT

In the present invention, by inputting an upper head size to a computer in addition to a front & back length-size and a right & left width-size of a head portion of a helmet wearer and by data-processing them, there is employed a configuration in which a kind of the helmet size and a shape of a pad such as a pad, in the region consisting of the head-top portion and the vicinity thereof, or the like, which fit the head portion of the helmet wearer, are to be selected. According to the present invention, it is possible to provide a selection method in which it is possible to easily select a kind of a preferable size of the helmet, and a preferable shape of the pad in the region consisting of the head-top portion and the vicinity thereof.

22 Claims, 16 Drawing Sheets

FIG. 2D (size L, table 124, columns 162–175, rows 189–209)

FIG. 2E (size XL, table 125, columns 168–181, rows 195–215)

FIG. 2F (size XXL, table 126, columns 174–187, rows 201–221)

METHOD OF SELECTING KIND OF SIZE OF A HELMET AND SHAPE OF A PAD, METHOD OF ADJUSTING HELMET SIZE BY USING THE SELECTION METHOD, AND HEAD SIZE MEASURING TOOL USED IN AFORESAID SELECTION METHOD

TECHNICAL FIELD

The present invention relates to a selection method of selecting a kind of size of a helmet and a shape of a pad comprising: a process for inputting a front & back length-size and a right & left width-size of a head portion of a helmet wearer as data respectively into a computer which can utilize a program necessary for the selection of the kind of the helmet size and the shape of the pad; and a process for respectively selecting the kind of the helmet size and the shape of the pad, which respectively fit the helmet wearer, by data-processing the front & back length-size and the right & left width-size by using the program. In addition, the present invention relates also to a method of adjusting the size of a helmet by using the selection method. Further, the present invention relates also to a head size measuring tool which is used in the selection method and which can measure the front & back length-size and the right & left width-size of the had portion of the helmet wearer comprising a first measuring tool piece and a second measuring tool piece which is reciprocatingly movable relatively with respect to the first measuring tool piece, wherein in the head size measuring tool in which it is constituted such that the front & back length-size can be measured by the relative reciprocating movement position of the second measuring tool piece with respect to the first measuring tool piece in a first abutting state in which the first measuring tool piece is abutted to a front side surface or a back side surface of the head portion and concurrently, the second measuring tool piece is abutted to the back side surface or the front side surface of the head portion, and it is constituted such that the right & left width-size can be measured by the relative reciprocating movement position of the second measuring tool piece with respect to the first measuring tool piece in a second abutting state in which the first measuring tool piece is abutted to a left side surface or a right side surface of the head portion and concurrently, the second measuring tool piece is abutted to the right side surface or the left side surface of the head portion.

BACKGROUND OF THE INVENTION

For the helmet size, generally, there have been known six kinds of an XS size (53 cm to 54 cm), an S size (55 cm to 56 cm), an M size (57 cm to 58 cm), an L size (59 cm to 60 cm), an XL size (61 cm to 62 cm) and an XXL size (63 cm to 64 cm). It should be noted that the numerical values in aforesaid parentheses are values indicating the circumferential length of the head portion of the helmet wearer. Then, for the helmets having these six kinds of sizes, the portions corresponding to the head circumferential lengths of the head-portion accommodating spaces thereof are formed as substantially elliptical shapes which are substantially analogous to one another.

In a helmet sales dealer selling helmets, in case of selling a helmet to a person expected to buy a helmet such as a person expected to wear a helmet or the like, who is expected to wear a helmet, there is employed a configuration in which a helmet having a size offered by a person expected to buy the helmet is to be sold to this person expected to buy the helmet or in which the circumferential length of the head portion of the person expected to wear the helmet is actually measured by a tape measure or the like, the kind of the fitted size is selected depending on the fitted size indication on the tape measurement corresponding to that actual measurement value, and a helmet having this selected kind of size is to be sold.

Also, in US2004/0204904A1, there is disclosed a method of selecting a kind of a helmet size and a shape of a pad by using a computer. Then, in aforesaid US2004/0204904A1, there is disclosed also a method of adjusting the helmet size by using aforesaid selection method. Further, in aforesaid US2004/0204904A1, there is disclosed a head size measuring tool used for actually measuring a front & back length-size and a right & left width-size of the head portion of a person expected to wear the helmet.

Specifically, in aforesaid head size measuring tool of aforesaid US2004/0204904A1, by moving a second measuring tool piece having a substantially reverse L-shape reciprocatingly with respect to a first measuring tool piece having a substantially reverse L-shape, there is employed a configuration in which the front & back length-size and the right & left width-size of the head portion of the person expected to wear the helmet is to be actually measured. Then, in aforesaid selection method of aforesaid US2004/0204904A1, by inputting the front & back length-size and the right & left width-size of the head portion of the person expected to wear the helmet as data respectively to a computer which can utilize a program necessary for the selection of aforesaid kind of the helmet size and aforesaid shape of the pad, and by data-processing aforesaid front & back length-size and aforesaid right & left width-size by using aforesaid program, there is employed a configuration in which there are carried out the respective selections of the kind of aforesaid helmet size and the shape of aforesaid pad, which respectively fit aforesaid person expected to wear the helmet. Further, in aforesaid adjustment method of aforesaid US2004/0204904A1, there is employed a configuration in which the helmet size is adjusted by using the selection result selected in aforesaid selection method of aforesaid US2004/0204904A1.

However, according to the head size measuring tool of aforesaid US2004/0204904A1, even if supposedly taking account of the actual measurement of the upper head height size of the head portion of the person expected to wear the helmet, which needs to be used in a first view point of the present invention described later, it is extremely difficult for this upper head height size to be actually measured accurately.

Also, in the selection method of the kind of the helmet size and the shape of the pad of aforesaid US2004/0204904A1, it is not taken into account at all about a matter of actually measuring the upper head height size of the head portion of the person expected to wear the helmet such as shown in a first view point of the present invention described later. For this reason, there is a fear that the kind of the selected helmet size or the shape of selected pad does not adequately fit the head portion of the person expected to wear the helmet caused by the individual difference of the upper head height size.

Further, in the selection method of the kind of the helmet size and the shape of the pad shown in aforesaid US2004/0204904A1, a matter of actually measuring the right & left front-cheek width-size and the right & left back-cheek width-size of the head portion of the person expected to wear the helmet such as shown in a second view point of the present invention which will be described later is not taken into account at all. For this reason, on an occasion of the selection of the cheek pads on the left side and on the right side, there is employed a configuration in which a helmet mounted with a standard size cheek pad is worn by a person expected to wear the helmet and thereafter, the fit state of the size of the mounted cheek pad is found out from the person expected to wear the helmet. Then, in a case in which the size of the mounted cheek pad does not fit the person expected to wear the helmet, a cheek pad having a different size is re-mounted on the helmet and thereafter, there is employed a configuration in which the operation of finding out aforesaid fit state from the person expected to wear the helmet is repeated. Therefore, it takes a lot of trouble with the selection of the cheek pad and concurrently, there occurs a case in which it is not possible to obtain an objective fit state with regard to the cheek pad.

SUMMARY OF THE INVENTION

The present invention is an invention in which the defect of the method in the past such as described above can be made corrected effectively by a comparatively simple constitution.

Therefore, one object of the present invention is to provide a selection method in which it is possible to easily select a kind of helmet size which fits respectively with the front & back length-size and the right & left width-size of the head portion of the helmet wearer and concurrently, in which it is possible to easily select a shape of a pad in the region consisting of the head-top portion and the vicinity thereof, which fits the upper head height size of the head portion of the helmet wearer.

Also, another object of the present invention is to provide a selection method in which it is possible to easily select a shape of a cheek pad which fits respectively with the right & left front-cheek width-size and the right & left back-cheek width-size of the head portion of the helmet wearer.

Also, still another object of the present invention is to provide a selection method in which it is possible to easily select a kind of a helmet size which fits respectively with the front & back length-size and the right & left width-size of the head portion of the helmet wearer and concurrently, it is possible to easily select also a shape of a cheek pad which fits respectively with the right & left front-cheek width-size and the right & left back-cheek width-size of the head portion of the helmet wearer.

Also, still another object of the present invention is to provide an adjustment method in which it is possible to easily carry out the adjustment of a center pad which fits the selected shape of the pad.

Also, still another object of the present invention is to provide an adjustment method in which it is possible to easily carry out the adjustment of a cheek pad which fits the shape of the selected cheek pad.

Also, still another object of the present invention is to provide a head size measuring tool in which it is possible to actually measure each of the front & back length-size, the right & left width-size and the upper head height size of the head portion of the helmet wearer reliably by a comparatively simple operation.

In its first view point, the present invention relates to a selection method of selecting a kind of size of a helmet and a shape of a pad comprising: a process for inputting a front & back length-size and a right & left width-size of a head portion of a helmet wearer as data respectively into a computer which can utilize a program necessary for the selection of the kind of aforesaid helmet size and the shape of aforesaid pad; and a process for respectively selecting the kind of aforesaid helmet size and the shape of aforesaid pad, which respectively fit aforesaid helmet wearer, by data-processing aforesaid front & back length-size and aforesaid right & left width-size by using aforesaid program, characterized by further comprising: a process for inputting the upper head height size of the head portion of aforesaid helmet wearer as data into aforesaid computer, and a process for selecting the shape of the pad in the region consisting of the head-top portion and the vicinity thereof, which fits aforesaid helmet wearer, by data-processing aforesaid upper head height size by using aforesaid program.

Then, in a first aspect of aforesaid first view point, the present invention is characterized in that the selection of the shape of the pad in the region consisting of aforesaid head-top portion and the vicinity thereof includes a selection of whether it is necessary or unnecessary to adjust the region consisting of the head-top portion and the vicinity thereof of the center pad by an additional pad for the head-top portion. Also, in a second aspect of aforesaid first view point, the present invention is characterized by further comprising: a process for inputting a right & left front-cheek width-size of the head portion of aforesaid helmet wearer (This right & left front-cheek width-size means the distance between the region consisting of a projection portion and the vicinity thereof of a left side cheek-bone of aforesaid head portion, and the region consisting of a projection portion and the vicinity thereof of a right side cheek-bone of aforesaid head portion.) and a right & left back-cheek width-size (This right & left back-cheek width-size means the distance between the region consisting of a portion and the vicinity thereof on the slightly front side from the lower end of a left side earlobe within the left side cheek portion of aforesaid head portion, and the region consisting of a portion and the vicinity thereof on the slightly front side from the lower end of a right side earlobe within the right side cheek portion of aforesaid head portion.) respectively to aforesaid computer as data thereof, and a process for selecting a shape of the cheek pad fitting aforesaid helmet wearer by data-processing aforesaid right & left front-cheek width-size and aforesaid right & left back-cheek width-size by using aforesaid program. Further, in a third aspect of aforesaid first view point, the present invention is characterized that aforesaid upper head height size is a height size, from a region on the upper side as much as a range of 0 cm to 4 cm (preferably, 1 cm to 3 cm) from the upper ends of respective base portions of a left ear and a right ear of aforesaid head portion, up to a head-top portion.

In its second view point, the present invention relates to a selection method of selecting a kind of size of a helmet and a shape of a pad, comprising: a process for inputting a front & back length-size and a right & left width-size of a head portion of a helmet wearer as data respectively into a computer which can utilize a program necessary for the selection of the kind of aforesaid helmet size and the shape of aforesaid pad; and a process for respectively selecting the kind of aforesaid helmet size and the shape of aforesaid pad, which respectively fit aforesaid helmet wearer, by data-processing aforesaid front & back length-size and aforesaid right & left width-size by using aforesaid program, characterized in that there are further comprised: a process for inputting a right & left front-cheek width-size of the head portion of aforesaid helmet wearer (This right & left front-cheek width-size means the distance between the region consisting of a projection portion and the vicinity thereof of a left side cheek-bone of aforesaid head portion, and the region consisting of a projection portion and the vicinity thereof of a right side cheek-bone of aforesaid head portion.) and a right & left back-cheek width-size (This right & left back-cheek width-size means the distance between the region consisting of a portion and the vicinity thereof on the slightly front side from the lower end of a left side earlobe within the left side cheek portion of aforesaid head portion, and the region consisting of a portion and the vicinity thereof on the slightly front side from the lower end of a right side earlobe within the right side cheek portion of aforesaid head portion.) respectively to aforesaid computer as data thereof, and a process for selecting a shape of the cheek pad fitting aforesaid helmet wearer by data-processing aforesaid right & left front-cheek width-size and aforesaid right & left back-cheek width-size by using aforesaid program.

Then, in the third aspect of aforesaid first view point and in a first aspect of aforesaid second view point, the present invention is characterized in that the selection of the shape of aforesaid cheek pad includes: to select a cheek pad fitting aforesaid helmet wearer from within the plural kinds of cheek pads whose thicknesses are mutually different. Also, in the fourth aspect of aforesaid first view point and in a second aspect of aforesaid second view point, the present invention is characterized by further comprising: a process for respectively displaying the selected kind of aforesaid helmet size and the selected shape of aforesaid pad. Further, in the fifth aspect of aforesaid first view point and in a third aspect of aforesaid second view point, the present invention is characterized in that the selection of the shape of aforesaid pad fitting aforesaid helmet wearer includes a selection of whether or not it is necessary or unnecessary to employ the center pad adjustment by at least one additional pad within the front side additional pad, the back side additional pad, the left side additional pad and the right side additional pad.

Then, in its third view point, the present invention relates to a method of adjusting the size of a helmet by using the selection method of aforesaid first view point, characterized in that at least one kind of additional pad is disposed on aforesaid center pad based on the shape of said selected pad. Also, in its fourth view point, the present invention relates to a method of adjusting the size of a helmet by using a selection method of aforesaid second view point, characterized in that any one kind of cheek pad within the plural kinds of cheek pads is disposed inside aforesaid helmet based on the shape of aforesaid selected cheek pad.

Further, in its fifth view point, the present invention relates to a head size measuring tool which is used in the selection method of aforesaid first view point, and which can measure the front & back length-size and the right & left width-size of the head portion of the helmet wearer comprising: a first measuring tool piece and a second measuring tool piece which is reciprocatingly movable relatively with respect to the first measuring tool piece, wherein in a head size measuring tool in which it is constituted such that aforesaid front & back length-size can be measured by the relative reciprocating movement position of aforesaid second measuring tool piece with respect to aforesaid first measuring tool piece in a first abutting state in which aforesaid first measuring tool piece is abutted to a front side surface or a back side surface of aforesaid head portion and concurrently, aforesaid second measuring tool piece is abutted to the back side surface or the front side surface of said head portion, and it is constituted such that aforesaid right & left width-size can be measured by the relative reciprocating movement position of aforesaid second measuring tool piece with respect to aforesaid first measuring tool piece in a second abutting state in which aforesaid first measuring tool piece is abutted to a left side surface or a right side surface of aforesaid head portion and concurrently, aforesaid second measuring tool piece is abutted to the right side surface or the left side surface of aforesaid head portion, characterized in that there is comprised a third measuring tool piece which is reciprocatingly movable relatively with respect to aforesaid first or second measuring tool piece; and it is constituted such that aforesaid upper head height size can be measured by the relative reciprocating movement position of aforesaid third measuring tool piece with respect to aforesaid first or second measuring tool piece in a third abutting state in which aforesaid third measuring tool piece is abutted to the head-top portion of aforesaid head portion in aforesaid second abutting state of aforesaid first and second measuring tool pieces.

Then, in a first aspect aforesaid fifth view point, the present invention is characterized in that a first length scale is provided for one of aforesaid first and second measuring tool pieces, a first index corresponding to aforesaid first length scale is provided for the other of aforesaid first and second measuring tool pieces, a second length scale is provided for one of aforesaid first or second measuring tool piece and aforesaid third measuring tool piece, and a second index corresponding to aforesaid second length scale is provided for the other of aforesaid first or second measuring tool piece and aforesaid third measuring tool piece. Also, in a second aspect of aforesaid fifth view point, the present invention is characterized by comprising: first fixation means which can fix aforesaid second measuring tool piece operably for the fixation release thereof with respect to aforesaid first measuring tool piece, and a second fixation means which can fix aforesaid third measuring tool piece operably for the fixation release thereof with respect to aforesaid first or second measuring tool piece. In this case, it is possible to employ a configuration in which each of aforesaid first fixation means and aforesaid second fixation means is a fixing screw.

The above, and other, objects, features and advantages of this invention will become readily apparent from the following detailed description thereof which is to be read in connection with the accompanying drawings.

BRIEF DESCRIPTION OF THE DRAWINGS

FIG. 2A is a schematic adjustment data table of an XS-size relating to the front & back length-size and the right & left width-size for being displayed in the display column of the diagnosis result shown in FIG. 1;

FIG. 2B is a schematic adjustment data table of an S-size relating to the front & back length-size and the right & left width-size for being displayed in the display column of the diagnosis result shown in FIG. 1;

FIG. 2C is a schematic adjustment data table of an M-size relating to the front & back length-size and the right & left width-size for being displayed in the display column of the diagnosis result shown in FIG. 1;

FIG. 2D is a schematic adjustment data table of an L-size relating to the front & back length-size and the right & left width-size for being displayed in the display column of the diagnosis result shown in FIG. 1;

FIG. 2E is a schematic adjustment data table of an XL-size relating to the front & back length-size and the right & left width-size for being displayed in the display column of the diagnosis result shown in FIG. 1;

FIG. 2F is a schematic adjustment data table of an XXL-size relating to the front & back length-size and the right & left width-size for being displayed in the display column of the diagnosis result shown in FIG. 1;

FIG. 4 is a schematic adjustment data table of XS-size, S-size, M-size, L-size, XL-size and XXL-size relating to the upper head height size, which is for being displayed in the display column of the diagnosis result shown in FIG. 1;

Figures 5E, 5F:
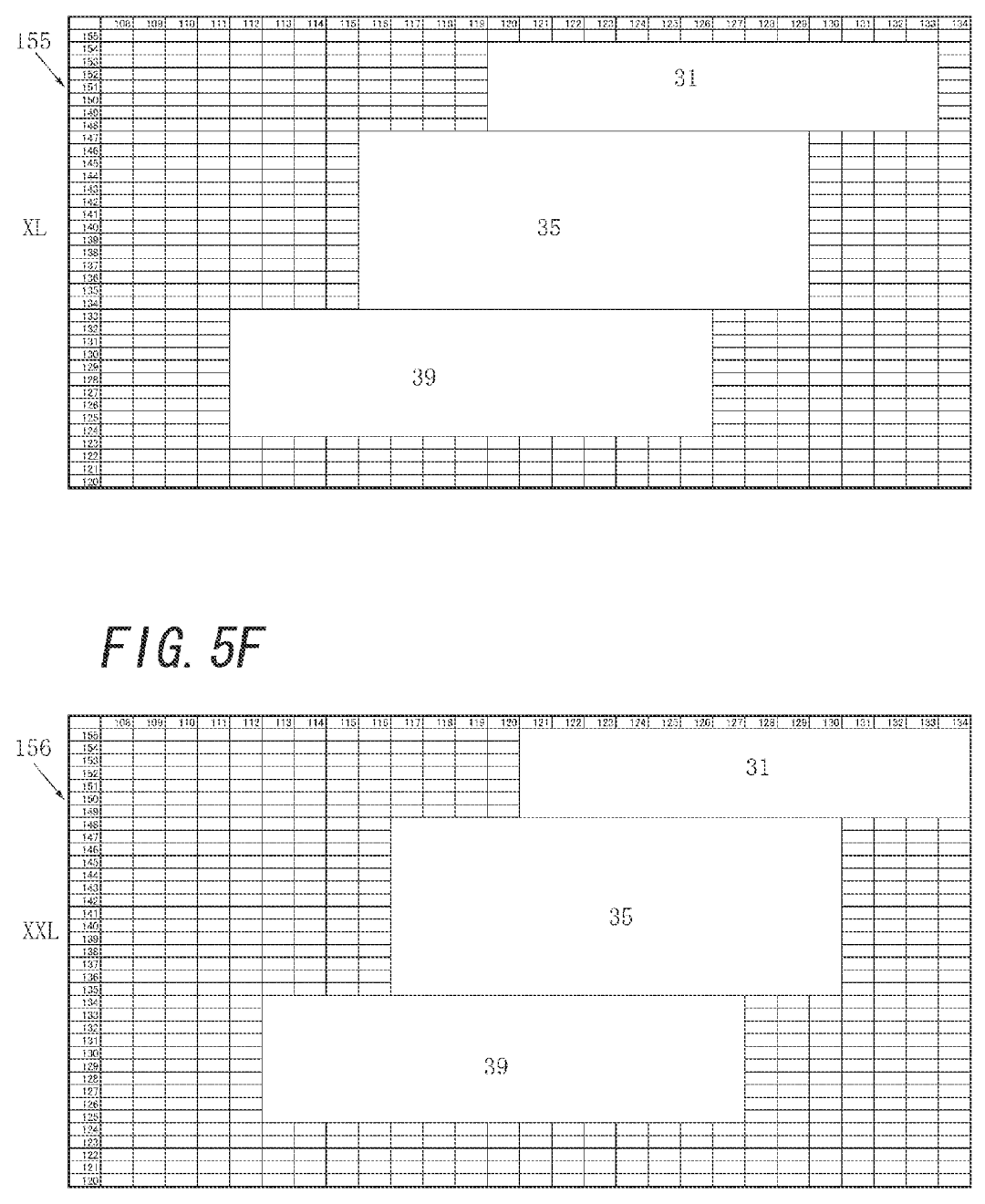

FIG. 5E is a schematic adjustment data table of an XL-size relating to the right & left front-cheek width-size and the right & left back-cheek width-size, which is for being displayed in the display column of the diagnosis result shown in FIG. 1;

FIG. 5F is a schematic adjustment data table of an XXL-size relating to the right & left front-cheek width-size and the right & left back-cheek width-size, which is for being displayed in the display column of the diagnosis result shown in FIG. 1;

DETAILED DESCRIPTION OF THE INVENTION

Figure 1:
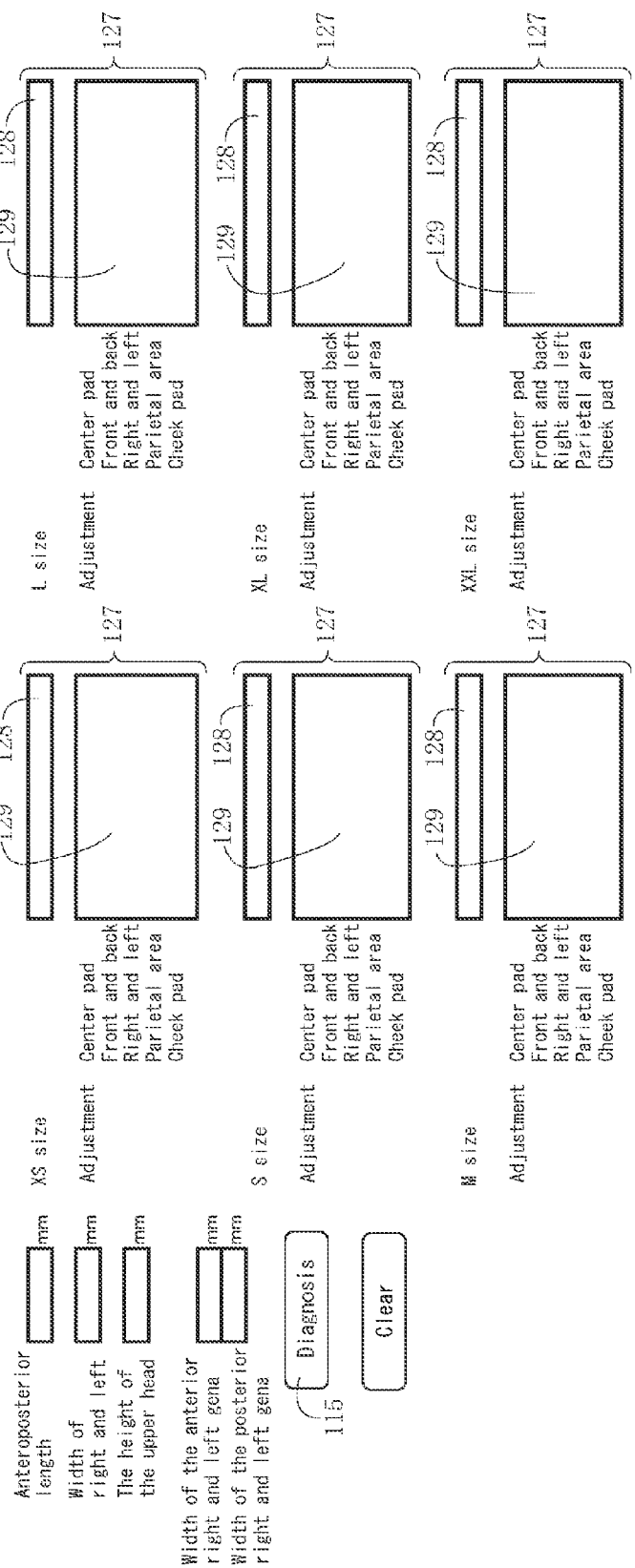
FIG. 1 denotes a picture screen of a personal computer showing helmet size diagnosis results used for one exemplified embodiment in which the present invention is applied to a method in which a kind of size of a full-face helmet and a shape of a pad are selected and this selected kind of size of the helmet is adjusted if required.

Next, one exemplified embodiment in which the present invention is applied to a method in which a fit-kind of a full-face helmet size is selected and a size adjustment is carried out if required with regard to the helmet having that selected kind of size will be explained while referring to the drawings by being itemized into "1. Constitution of Head Size Measuring Tool", "2. Measurement of Head size" and "3. Selection of Kind of Helmet Size and Kind of Pad Based on Actual Measurement Value of Head size".

1. Constitution of Head Size Measuring Tool

As shown in FIG. 6 to FIG. 12, a head size measuring tool 1 includes three kinds of measuring tool pieces 2, 3, 4 which are respectively constituted substantially in reverse L-shapes. Then, the first measuring tool piece 2 and the second measuring tool piece 3 are constituted to be slidable each other. Also, it is constituted, when the second measuring tool piece 3 becomes in a maximum extension state with respect to the first measuring tool piece 2, such that these first and second measuring tool pieces 2, 3 form a substantially reverse U-shape as a whole. It should be noted that it is preferable for these three kinds of measuring tool pieces 2, 3, 4 to be constituted from transparent or translucent plastic materials or the like.

Figure 11:
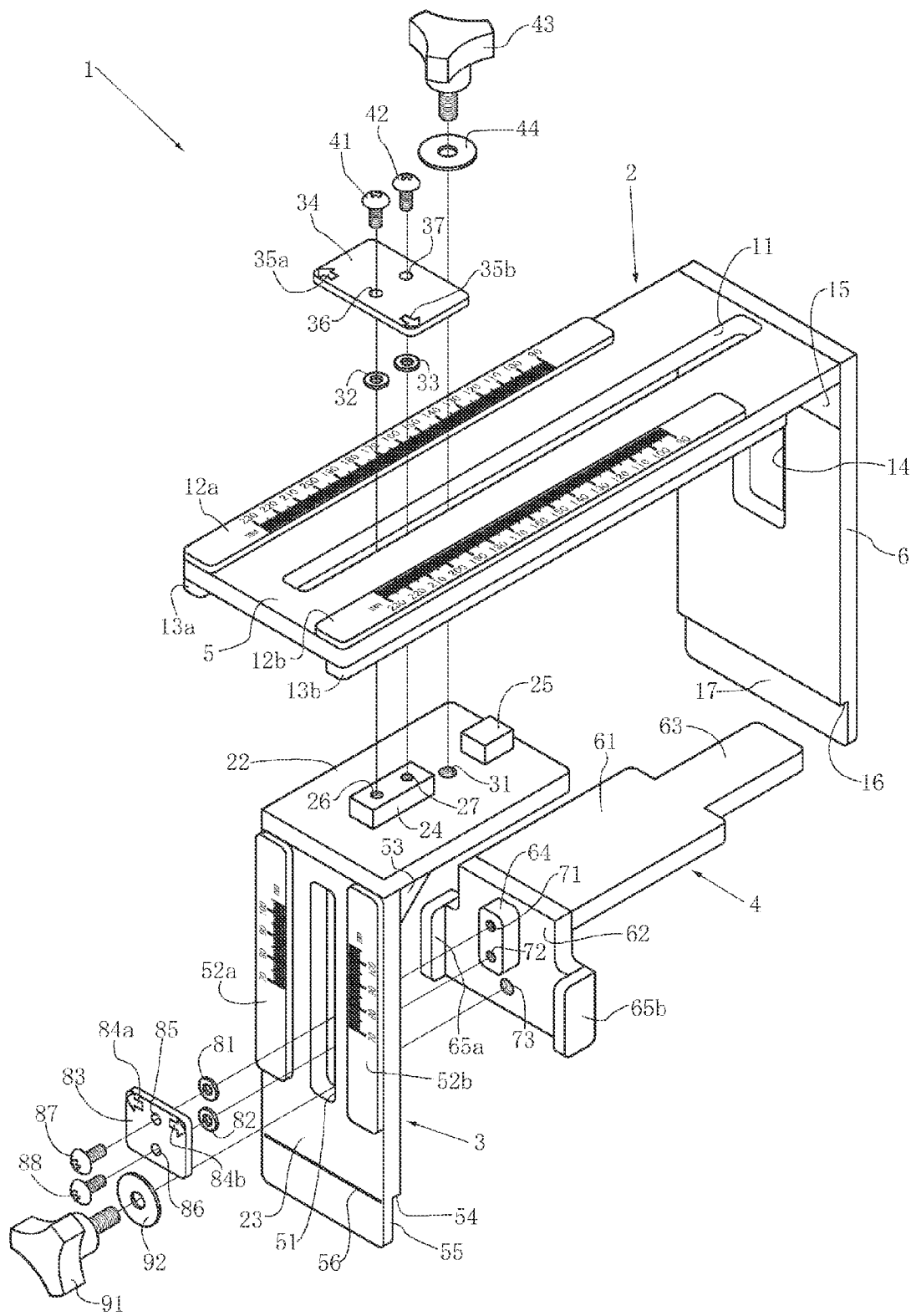
FIG. 11 is an exploded perspective view when seeing the head size measuring instrument shown in FIG. 6 from an obliquely upper side.
Figure 12:
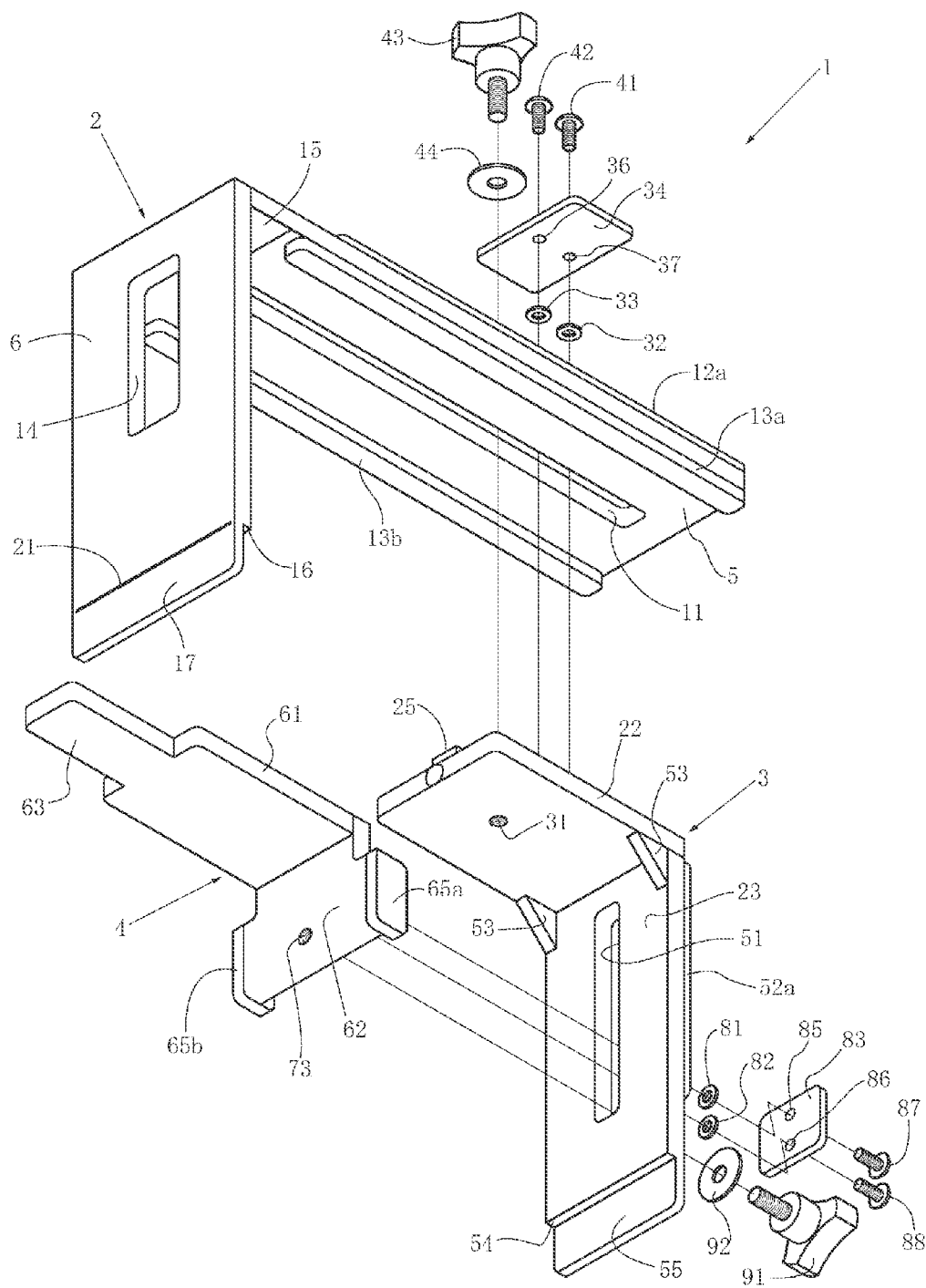
FIG. 12 is an exploded perspective view when seeing the head size measuring instrument shown in FIG. 6 from an obliquely lower side.

Specifically, as shown in FIG. 11 and FIG. 12, the first measuring tool piece 2 is constituted substantially in a reverse L-shape by an upper plate portion 5 and a side plate portion 6. Then, on the upper plate portion 5, there is formed a guide slit 11 as a through-hole, which is extended at the center portion of this upper plate portion 5 along the length direction thereof. Also, on the upper surface of the upper plate portion 5, there are disposed a pair of length scale plates 12a, 12b extending along both of the end portions of the upper plate portion 5 respectively so as to be positioned on the both sides of the guide slit 11. Further, on the lower surface of the upper plate portion 5, there are disposed a pair of guide rail units 13a, 13b extending along both of the side portions of the upper plate portion 5 respectively so as to be positioned on the both sides of the guide slit 11. Then, the pair of guide rail units 13a, 13b is abutting the upper surface of an upper plate portion 22 respectively. Also, substantially at the center upper portion of the side plate portion 6, there is formed an escape hole 14 as a through-hole. Further, in mutual intersect regions between the base inside surface of the upper plate portion 5 and the upper inside surface of the side plate portion 6, there are disposed a pair of reinforcement abutting-plates 15, which can have substantially right triangle shapes. Then, on the inside surface of the lower end portion of the side plate portion 6, there is provided a notch portion, so that at aforesaid lower end portion, there are formed a step portion 16 and a thin thickness portion 17 respectively. Also, on the outside surface of the side plate portion 6, there is formed a reference line 21 for measurement so as to substantially face the step portion 16 in the plate-thickness direction. It should be noted that it is allowed for the up & down length of the thin thickness portion 17, for example, to be substantially 2 cm. Then, it is preferable for the up & down length of this thin thickness portion 17 to be generally in a range of 1 cm to 3 cm seen from the view point of practicality and it is more preferable to be in a range of 1.5 cm to 2.5 cm.

As shown in FIG. 11 and FIG. 12, the second measuring tool piece 3 is constituted substantially in a reverse L-shape by an upper plate portion 22 and a side plate portion 23. Then, on the upper plate portion 22, there are disposed a pair of guide projection units 24, 25 sequentially extending substantially at the center portion of this upper plate portion 22 along the length direction thereof. It should be noted that this pair of guide projection units 24, 25 fit into the guide slit 11 of the first measuring tool piece 2 respectively. Therefore, it is possible for the second measuring tool piece 3 to reciprocate relatively with respect to the first measuring tool piece 2 by a mechanism that the guide projection units 24, slide inside the guide slit 11 toward the length direction of this slit 11.

As shown in FIG. 11 and FIG. 12, for the guide projection unit 24, there are formed a pair of screw holes 26, 27 which are opened on the upper surface of this guide projection unit 24 respectively. Then, on the upper plate portion 22, there is formed a screw hole 31 as a through-hole between the pair of guide projection units 24, 25. Also, in a state in which the pair of guide projection units 24, 25 fit into the guide slit 11 (hereinafter, referred to as "aforesaid first fitting state"), the respective upper surfaces of the guide projection units 24, are substantially in a state of being flush with the upper surface of the upper plate portion 5. Then, in aforesaid first fitting state, spacer washers 32, 33 are abutted to the upper surface of the guide projection unit 24 and thereafter, an index plate 34 is abutted to these washers 32, 33. Also, on the upper surface of this index plate 34, there are disposed a pair of indexes 35*a*, 35*b* for the pair of length scale plates 12*a*, 12*b* respectively. Further, on the index plate 34, there are disposed a pair of screw through-holes 36, 37 corresponding to the pair of screw holes 26, 27 respectively substantially in the up & down direction. Then, a pair of screws 41, 42 is screwed in the pair of screw holes 26, 27 respectively through the pair of screw through-holes 36, 37 and the pair of spacer washers 32, 33 respectively. Therefore, the index plate 34 is mounted and fixed on the guide projection unit 24 in a state of uplifted with respect to the guide projection unit 24 as much as a distance substantially corresponding to the thickness of the pair of spacer washers 32, 33. Further, a fixing screw 43 is screwed in the screw hole 31 through a washer 44 having a comparatively large diameter and the guide slit 11 respectively. Therefore, this washer 44 abuts the upper surface of the upper plate portion 5. It should be noted that when screwing-in the fixing screw 43 adequately, the washer 44 is pressed strongly onto the upper surface of the upper plate portion 5. For this reason, the second measuring tool piece 3 is fixed to the first measuring tool piece 2, so that a relative slide of the second measuring tool piece 3 with respect to this first measuring tool piece 2 is blocked.

As shown in FIG. 11 and FIG. 12, for the side plate portion 23 of the second measuring tool piece 3, there is formed a guide slit 51 as a through-hole, which is extended at the center portion of this side plate portion 23 along the length direction thereof. Then, on the outside surface of the side plate portion 23, there are disposed a pair of length scale plates 52*a*, 52*b* which are extended along both the end portions of the side plate portion 23 respectively so as to be positioned at the both sides of aforesaid guide slit 51. Also, in the mutual intersection region between the base inside surface of the side plate portion 23 and the upper inside surface of the upper plate portion 22, there are disposed a pair of reinforcement abutting-plates 53 which may have substantially right triangle shapes. Further, on the inside surface of the lower end portion of the side plate portion 23, there is provided a notch portion. For this reason, at aforesaid lower end portion, there are formed a step portion 54 and a thin thickness portion 55 respectively. Then, on the outside surface of the side plate portion 23, there is formed a reference line for measurement so as to face substantially to the step portion 54 in a plate thickness direction. It should be noted that the up & down length of the thin thickness portion 55 may be, for example, substantially 2 cm. Then, it is preferable for the up & down length of this thin thickness portion 55 to be generally in a range of 1 cm to 3 cm seen from the view point of practicality and it is more preferable to be in a range of 1.5 cm to 2.5 cm.

As shown in FIG. 11 and FIG. 12, the third measuring tool piece 4 is constituted substantially in a reverse L-shape by an upper plate portion 61 and a side plate portion 62. Then, a portion of substantially a half length on the tip portion side in the length direction within the upper plate portion 61 is formed as a narrow width portion 63 which can be passed through the escape hole 14 of the first measuring tool piece 2. Also, at the side plate portion 62, there is disposed a guide projection unit 64 which is extended substantially at the center portion of this side plate portion 62 along the up & down direction thereof. It should be noted that this guide projection unit 64 fits into the guide slit 51 of the second measuring tool piece 3. Further, at the end portions on the both sides of the side plate portion 62, there are disposed a pair of projection wall portions 65*a*, 65*b* which protrude toward the outside respectively so as to be substantially perpendicular with respect to this side plate portion 62. Then, the side plate portion 23 is fitted between the pair of projection wall portions 65*a*, 65*b*. Therefore, it is possible for the third measuring tool piece 4 to reciprocate relatively with respect to the second measuring tool piece 3 by a mechanism in which the guide projection unit 64 slides relatively in the length direction (in other words, up & down direction) of this slit 51 in the inside of the guide slit 51. Then, at the time of this reciprocating movement, the end portions on the both sides of the side plate portion 23 slide relatively with respect to a pair of surfaces, which face each other within the pair of projection wall portions 65*a*, 65*b*, in a state of abutting these pair of surfaces.

As shown in FIG. 11 and FIG. 12, at the guide projection unit 64, there are formed a pair of screw holes 71, 72 which are opened respectively on the side surface of this guide projection unit 64. Then, at the side plate portion 62, there is formed a screw hole 73 as a through-hole on the lower side of the guide projection unit 64. Also, in a state in which the guide projection unit 64 fits into the guide slit 51 (hereinafter, referred to as "aforesaid second fitting state"), the outside surface (specifically, surface opposite to the side plate portion 23) of the guide projection unit 64 is substantially in a state of being flush with the outside surface of the side plate portion 23. Then, in aforesaid second fitting state, spacer washers 81, 82 are abutted to the side surface of the guide projection unit 64 and thereafter, an index plate 83 is abutted to these washers 81, 82. Also, on the outside surface of this index plate 83, there are disposed a pair of indexes 84*a*, 84*b* for the pair of length scale plates 52*a*, 52*b* respectively. Further, on the index plate 83, there are disposed a pair of screw through-holes 85, 86 corresponding to the pair of screw holes 71, 72 respectively substantially in the horizontal direction. Then, a pair of screws 87, 88 is screwed in the pair of screw holes 71, 72 respectively through the pair of screw through-holes 85, 86 and the pair of spacer washers 81, 82 respectively. Therefore, the index plate 83 is mounted and fixed on the guide projection unit 64 in a state of uplifted with respect to the guide projection unit 64 as much as a distance substantially corresponding to the thickness of the pair of spacer washers 81, 82. Further, a fixing screw 91 is screwed in the screw hole 73 through a washer 92 having a comparatively large diameter and the guide slit 51 respectively. Therefore, this washer 92 abuts the outside surface of the side plate portion 23. It should be noted that when screwing-in the fixing screw 91 adequately, the washer 92 is pressed strongly onto the outside surface of the side plate portion 23. For this reason, the third measuring tool piece 4 is fixed to the second measuring tool piece 3, so that a relative slide of the third measuring tool piece 4 with respect to this second measuring tool piece 2 is blocked.

2. Measurement of Head Size

Next, by using the head size measuring tool 1 shown in FIG. 11 and FIG. 12, there will be explained processes for actually measuring the sizes described in the following items (a) to (e) with regard to a head portion 94 of a helmet wearer 93 while referring to FIG. 6 to FIG. 10:

(a) Front & Back Length-Size (X),
(b) Right & Left Width-Size (Y),
(c) Upper Head Height Size (Z),
(d) Right & Left Front-Cheek Width-Size ($L_1$), and
(e) Right & Left Back-Cheek Width-Size ($L_2$).

(a) Actual Measuring Process of the Front & Back Length-Size (X)

Figure 6:
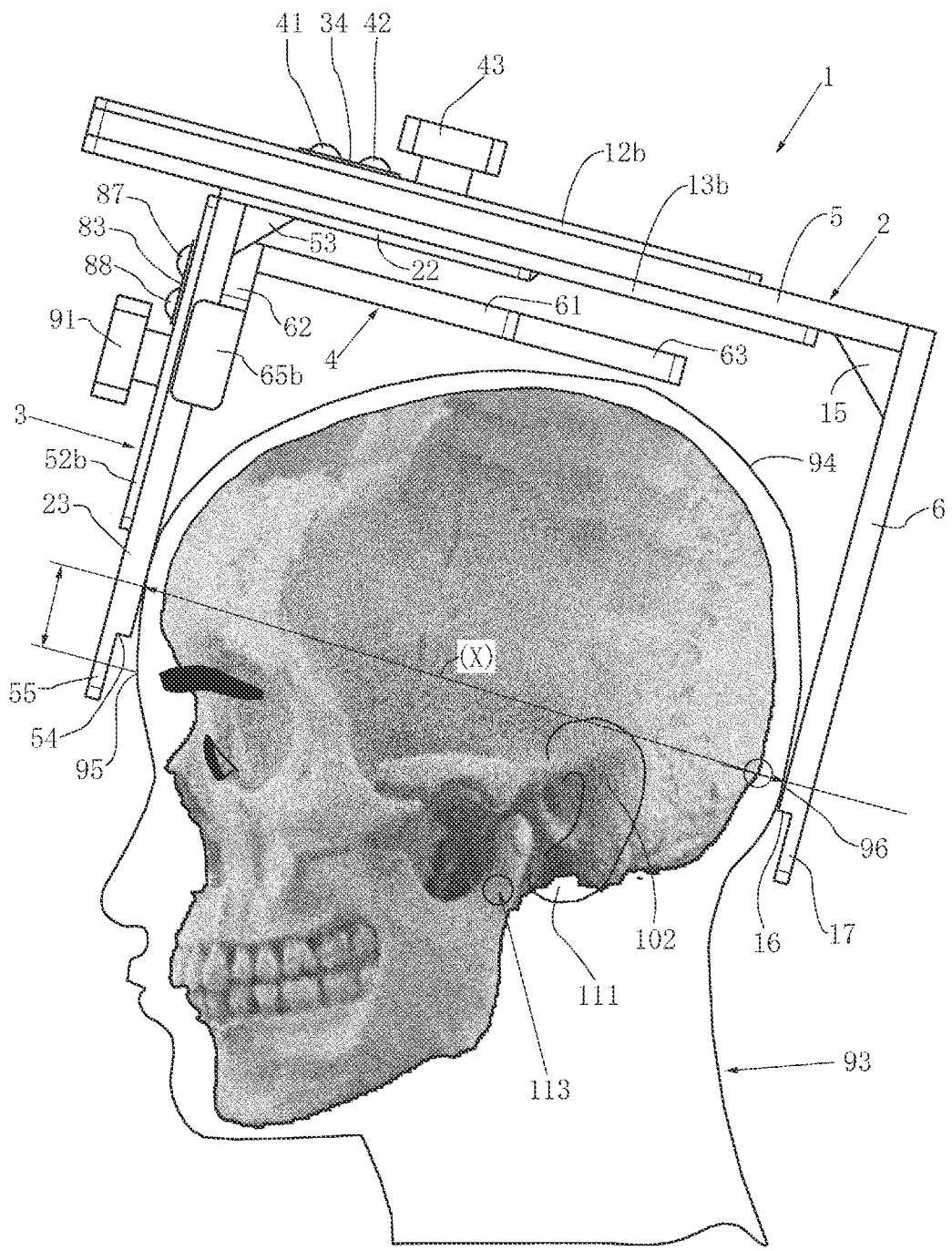
FIG. 6 is a left side view showing a state of measuring a front & back length-size by using a head size measuring instrument for measuring numerical values to be inputted in various kinds of numerical value input columns shown in FIG. 1.

First, when explaining an actual measuring process of the front & back length-size (X) shown in FIG. 6, the fixing screw of the head size measuring tool 1 is screwed back and thereafter, the distance between the pair of side plate portions 6, 23 of the first and second measuring tool pieces 2, 3 is set to be a little bit larger than the front & back length-size (X) of the head portion 94 of the helmet wearer 93. Subsequently, the head size measuring tool 1 is set on the head portion 94 such that the distance between the pair of side plate portions 6, 23 will correspond to a predetermined distance within the length from the front head portion to the back head portion of the head portion 94 (that is, such as shown in FIG. 6). It should be noted that aforesaid predetermined distance means, for example, the distance (X) between a composite region consisting of the region (which is on the upper side substantially by 1 cm from the center of a glabella 95 (see FIG. 10) of the helmet wearer 93) and the vicinity thereof, and a composite region consisting of the center of a projection portion 96 (which exists substantially at the center of an occipital bone) and the vicinity thereof. Then, for the up & down direction, when seen from the view point of practicality, it is generally preferable for a composite region consisting of aforesaid region on the upper side and the vicinity thereof to be a region existing by deviating toward the upper side in a range of 0.5 cm to 3 cm from the center of the glabella 95 of the helmet wearer 93, and it is more preferable for the composite region consisting of aforesaid region on the upper side and the vicinity thereof to be a region existing by deviating toward the upper side in a range of 0.75 cm to 2.5 cm. Also, for the right & left direction, when seen from the view point of practicality, it is generally preferable for the composite region consisting of aforesaid region on the upper side and the vicinity thereof to be a region existing by deviating toward the left or right side direction in a range of 0 cm to 1.5 cm from the center of the glabella 95 of the helmet wearer 93, and it is more preferable for the composite region consisting of aforesaid region on the upper side and the vicinity thereof to be a region existing by deviating toward the left or right side direction in a range of 0 cm to 1 cm. Further, for the up & down direction, when seen from the view point of practicality, it is generally preferable for a composite region consisting of the center of aforesaid projection portion 96 and the vicinity thereof to be a region existing toward the lower side in a range of 0.5 cm and toward the upper side in a range of 2 cm from the center of the projection portion 96, and it is more preferable for the composite region consisting of the center of aforesaid projection portion 96 and the vicinity thereof to be a region existing toward the lower side in a range of 0.25 cm and toward the upper side in a range of 1.5 cm from the center of the projection portion 96. It should be noted in this specification that the "helmet wearer 93" means that there are included a person who has a possibility to wear the helmet at least in future such as a person or the like who whishes to purchase and use a helmet 101 (see FIG. 13).

On an occasion of this actual measurement, the measurer (This measurer may be the helmet wearer 93 himself.) positionally-fixes the first measuring tool piece 2 with respect to the head portion 94 in a state in which the first measuring tool piece 2 is grasped by one hand. In this case, aforesaid measurer substantially makes the step portion 16 (in other words, reference line 21) of the first measuring tool piece 2 to correspond with a composite region consisting of the region (which is on the upper side substantially by 1 cm from the center of the glabella 95 of the helmet wearer 93) and the vicinity thereof (or a composite region consisting of the center of the projection portion 96, and the vicinity thereof). Together with this, aforesaid measurer positionally-fixes the second measuring tool piece 3 with respect to the head portion 94 by pressing the side plate portion 23 of the second measuring tool piece 3 toward the side plate portion 6 side of the first measuring tool piece 2 from the outside surface thereof in a state in which this second measuring tool piece 3 is grasped by the other hand. In this case, aforesaid measurer substantially makes the step portion 54 of the second measuring tool piece 3 (in other words, reference line 56) to correspond with a composite region consisting of the center of the projection portion 96 of the helmet wearer 93, and the vicinity thereof (or region which is on the upper side substantially by 1 cm from the center of the glabella 95). It should be noted that FIG. 6 shows a state of a process reaching a state at the time of the actual measurement of the front & back length size (X) such as described above.

Subsequently, when aforesaid measurer screws-in the fixing screw 43, the first and second measuring tool pieces 2, 3 which are shown in FIG. 6 respectively become in a fixation state in which they cannot slide mutually. Therefore, while maintaining the state in which the head size measuring tool 1 is mounted on the head portion 94 or after removing the tool from the head portion 94, it is enough if the numerical value of the length scale 12a or 12b which the index 35a or 35b indicates is to be read out as the actual measurement value of the front & back length-size (X) of the head portion 94. Therefore, this front & back length-size (X) means substantially the distance (in other words, length) from the front head portion of the head portion 94 to the back head portion.

(b) Actual Measuring Process of Right & Left Width-Size (Y)

Figure 7:
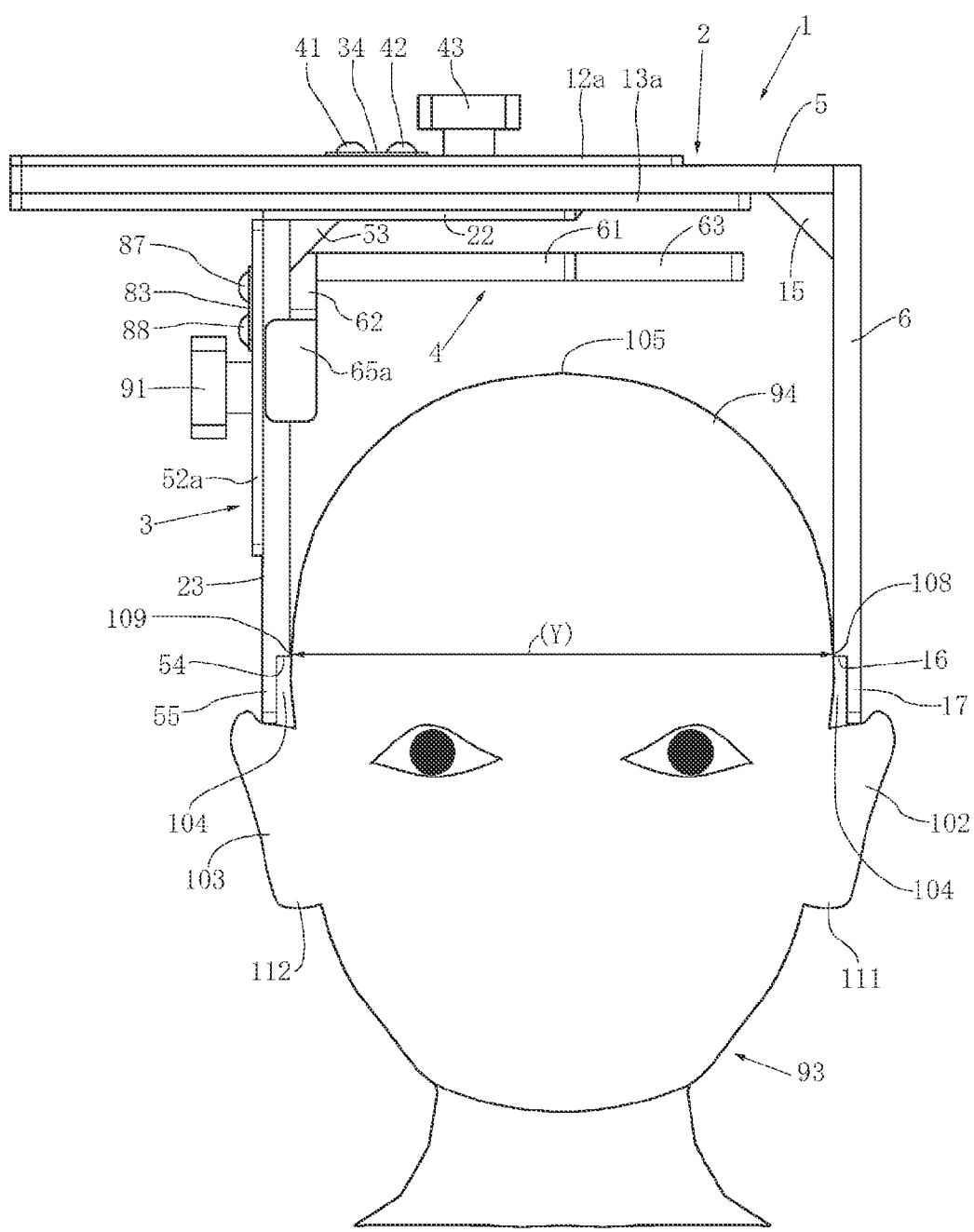
FIG. 7 is a front elevational view showing a state of measuring the right & left width-size by using the head size measuring instrument shown in FIG. 6.

Next, when explaining an actual measuring process of the right & left width-size (Y) shown in FIG. 7, the fixing screw 43 of the head size measuring tool 1 is screwed back and thereafter, the distance between the pair of side plate portions 6, 23 of the first and second measuring tool pieces 2, 3 is made to be a little bit larger than the right & left width-size of the head portion 94 of the helmet wearer 93. Subsequently, the head size measuring tool 1 is set on the head portion 94 such that the distance between the pair of side plate portions 6, 23 will correspond to a predetermined distance within the length from the left side head portion of the head portion 94 to the right side head portion (that is, such as shown in FIG. 7). It should be noted that aforesaid predetermined distance means, for example, the distance (Y) between a composite region 108 consisting of the region on the upper side and the vicinity thereof substantially by 2 cm from the upper end of the base portion of the left ear 102 within the left side head portion of the helmet wearer 93 and a composite region 109 consisting of the region on the upper side and the vicinity thereof substantially by 2 cm from the upper end of the base portion of the right ear 103 of the helmet wearer 93. Then, seen from the view point of practicality, it is generally preferable for the composite region 108 consisting of the region on the upper side and the vicinity thereof, and the composite region 109 consisting of the region on the upper side and the vicinity thereof to be regions existing by deviating toward the upper side in a range of 0 cm to 4 cm from the upper end of the base portion of the left ear 102 or the right ear 103 for the right & left direction, and it is more preferable to be regions existing by deviating toward the upper side in a range of 1 cm to 3 cm. Also, seen from the view point of practicality, it is generally preferable for the composite regions 108, 109 to be regions existing by deviating toward the left side or right side in a range of 0 cm to 3 cm from the upper end of the base portion of the left ear 102 or the right ear 103 for the right & left direction, and it is more preferable to be regions existing by deviating toward the left side or right side in a range of 0 cm to 2 cm from the upper end of the base portion of the left ear 102 or the right ear 103 for the right & left direction.

Also in a case mentioned above, it is enough if the relative slide and fixation of the second measuring tool piece 3 with respect to the first measuring tool piece 2 is to be carried out similarly as that described in the previous paragraph (that is, paragraph of "(a) Actual Measuring Process of Front & Back Length-Size (X)"). Then, FIG. 7 shows a state at the time of the actual measurement of the right & left width-size (Y) such as described above. Therefore, this right & left width-size (Y) means substantially the distance (in other words, length) between the left side head portion and the right side head portion of the head portion. It should be noted that there exist notch portions for forming thin thickness portions 17, 55, so that at the time of this actual measurement, as shown in FIG. 7, gaps 104 are formed between the thin thickness portions 17, 55 and the head portion 94. For this reason, it is possible to place a part of head hair of the helmet wearer 93 in these gaps 104 in a manner not to bother aforesaid actual measurement.

(c) Actual Measuring Process of Upper Head Height Size (Z)

Figure 8:
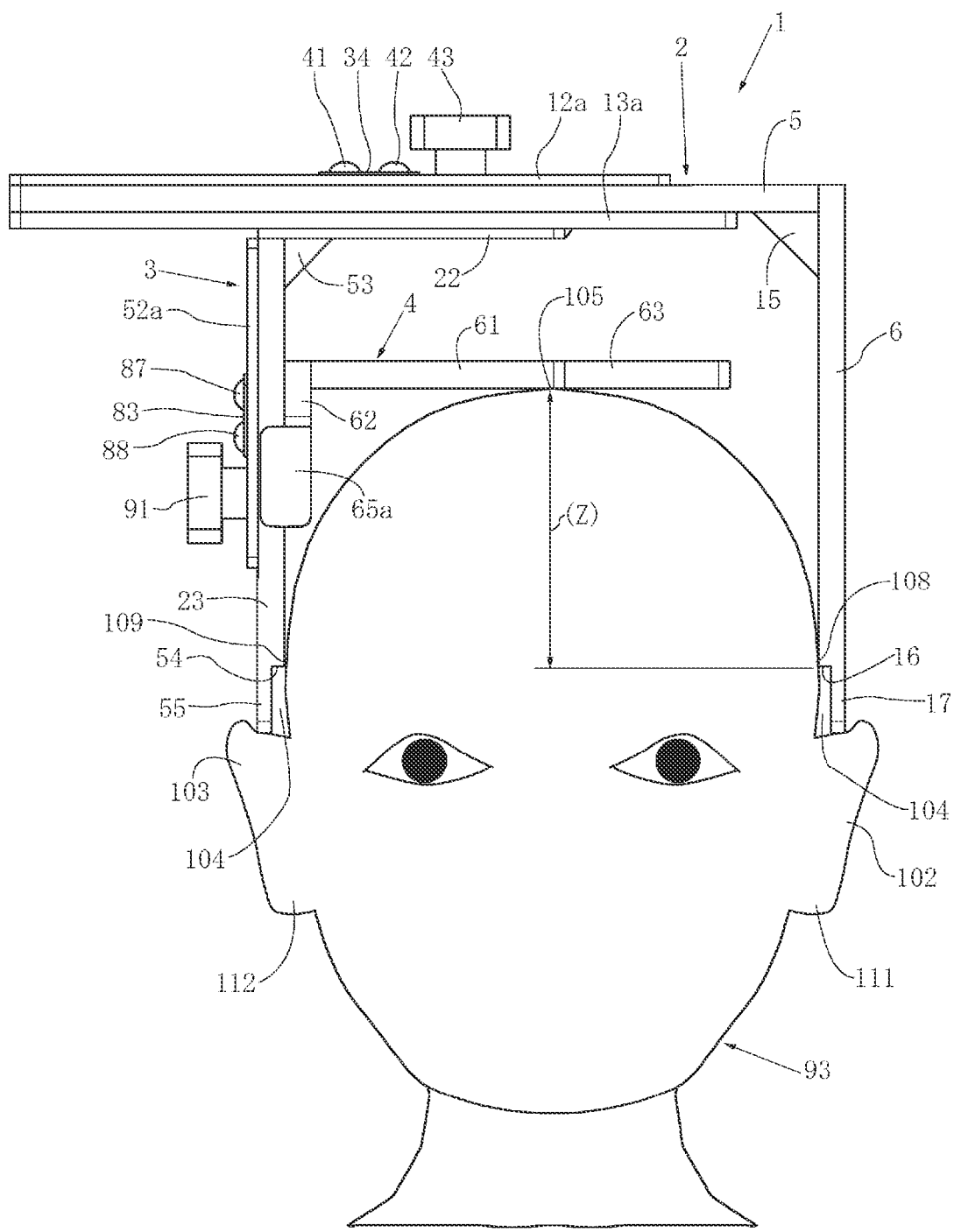
FIG. 8 is a front elevational view showing a state of measuring the upper head height size by using the head size measuring instrument shown in FIG. 6.
Figure 9:
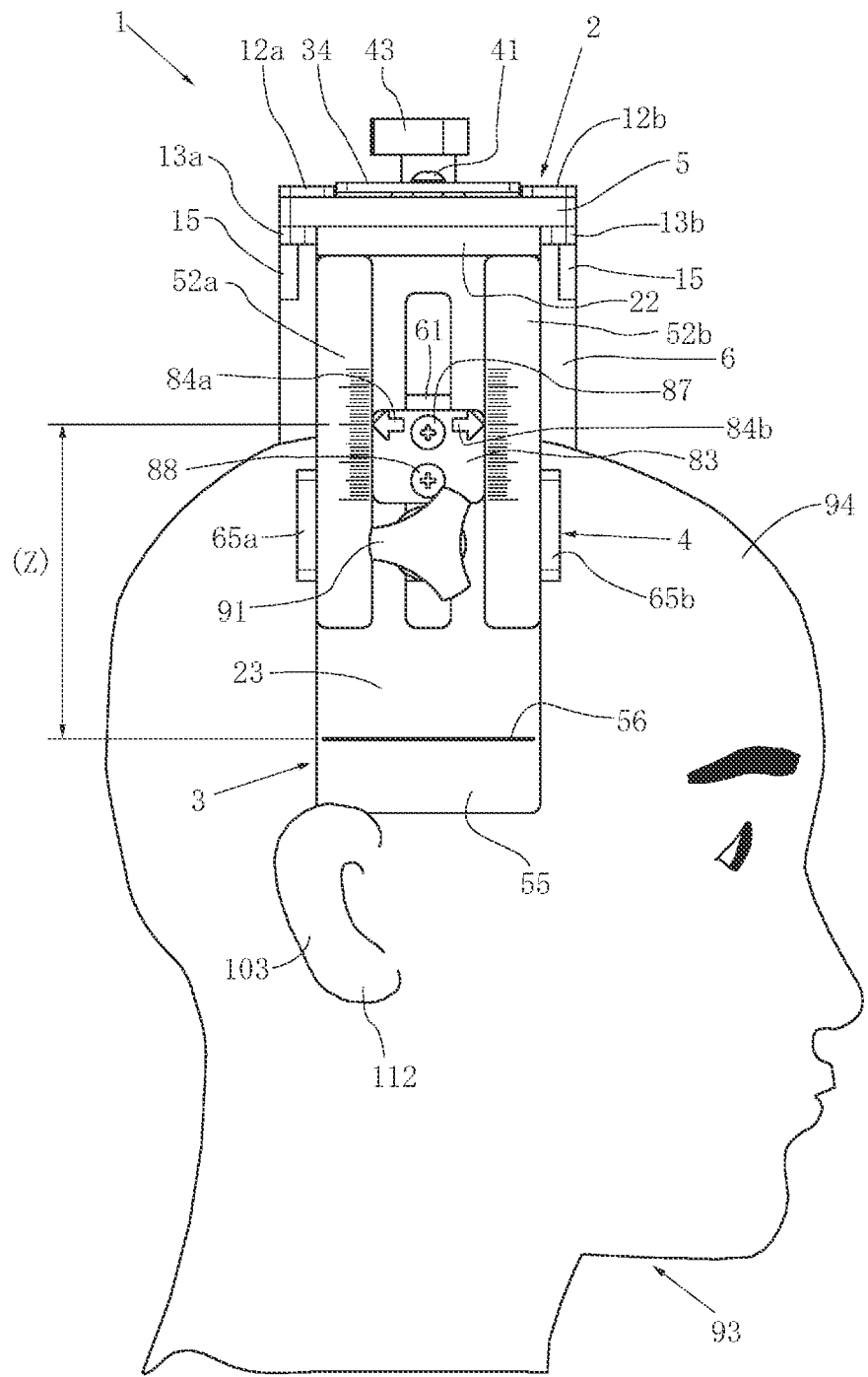
FIG. 9 is a right side view in the measurement state shown in FIG. 8.

Next, when explaining an actual measuring process of the upper head height size (Z) shown in FIG. 8 and FIG. 9, first, the fixing screw 91 is screwed back substantially in the same state as the state in the actual measuring process of the right & left width-size (Y) shown in FIG. 7. It should be noted that caused by this screw-back, the third measuring tool piece 4 becomes slidable substantially in the up & down direction with respect to the second measuring tool piece 3. Subsequently, aforesaid measurer positionally-fixes the third measuring tool piece 4 with respect to the head portion 94 by pressing the lower surface of the upper plate portion 61 of the third measuring tool piece 4 onto a region consisting of the head-top portion 105 and the vicinity thereof of the helmet wearer 93 by sliding this third measuring tool piece 4 substantially toward the lower side with respect to the second measuring tool piece 3.

Subsequently, when aforesaid measurer screws-in the fixing screw 91, the third measuring tool piece 4 becomes in a fixation state in which it cannot slide with respect to the second measuring tool piece 3. Therefore, while maintaining the state in which the head size measuring tool 1 is mounted on the head portion 94 or after removing the tool from the head portion 94, it is enough if the numerical value of the length scale plate 52a or 52b which the index 84a or 84b indicates as shown in FIG. 9 is to be read out as the upper head height size (Z) of the head portion 94. Therefore, this upper head height size (Z) means aforesaid upper half height (in other words, substantially the length in the up & down direction) when roughly dividing the head portion 94 evenly into an upper half and a lower half. It should be noted that preferably, aforesaid "upper half" means a portion having 30% to 45% (more preferably, 35% to 40%) length of the length of the head portion substantially in the up & down direction. Then, the four kinds of numerical value ranges (that is, numerical value ranges of 0 cm to 4 cm, 1 cm to 3 cm, 0 cm to 3 cm and 0 cm to 2 cm) described in the previous paragraph (that is, paragraph of "(b) Actual Measuring Process of Right & Left Width-Size (Y)") correspond similarly to this paragraph (that is, paragraph of "(c) Actual Measuring Process of Upper Head Height Size (Z)").

(d) Actual Measuring Process of Right & Left Front-Cheek Width-Size ($L_1$)

Figure 10:
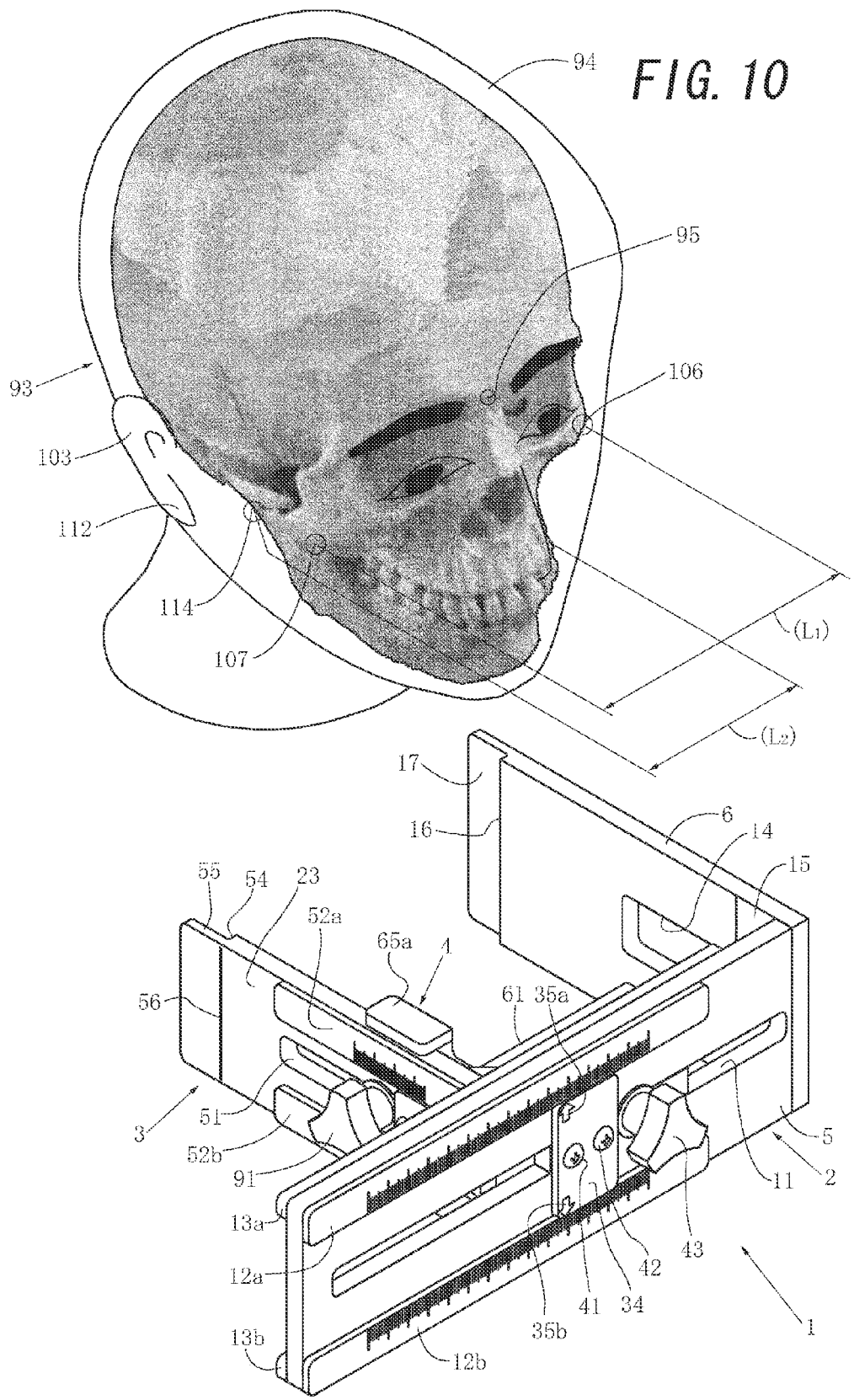
FIG. 10 is a perspective view showing a relation of measurement points of the right & left front-cheek width-size and the right & left back-cheek width-size with respect to the head size measuring instrument shown in FIG. 6 when measuring the right & left width-size and the right & left back-cheek width-size.

Next, when explaining an actual measuring process of the right & left front-cheek width-size ($L_1$) shown in FIG. 10, the fixing screw 43 of the head size measuring tool 1 is screwed back and thereafter, the distance between the pair of side plate portions 6, 23 of the first and second measuring tool pieces 2, 3 is made to be a little bit larger than the right & left front-cheek width-size of the head portion 94 of the helmet wearer 93. Subsequently, the head size measuring tool 1 is set on the head portion 94 such that the distance between the pair of side plate portions 6, 23 will correspond to a predetermined distance (that is, right & left front-cheek width-size ($L_1$) in FIG. 10) within the length from a region consisting of the upper portion and the vicinity thereof of the left side cheek portion of the head portion 94 to a region consisting of the upper portion and the vicinity thereof of the right side cheek portion. It should be noted that aforesaid predetermined distance means, for example, the distance ($L_1$) between a region 106 consisting of the projection portion and the vicinity thereof (specifically, a region consisting of the left side front-cheek portion, which is within this left side cheek-bone and is in a region consisting of the projection portion and the vicinity thereof in the slightly lower side portion from the outer corner of a left eye, and the vicinity thereof) of the left side cheek-bone of the head portion 94 of the helmet wearer 93, and a region 107 consisting of the projection portion and the vicinity thereof (specifically, a region consisting of the right side front-cheek portion which is within this right side cheek-bone and which is in a region consisting of the projection portion and the vicinity thereof in the slightly lower side portion from the outer corner of a right eye) of the right side cheek-bone. Then, it is preferable for each of the region consisting of aforesaid left side front-cheek portion and the vicinity thereof and the region consisting of aforesaid right side front-cheek portion to be included in the region which is surrounded by a virtual circle having a radius of 2 cm centering around a vertex of aforesaid left or right side projection portion, and more preferably, to be included in the region which is surrounded by a virtual circle having a radius of 1 cm centering around a vertex of aforesaid left or right side projection portion.

Also in a case mentioned above, is enough if the relative slide and fixation of the second measuring tool piece 3 with respect to the first measuring tool piece 2 is to be carried out similarly as that described in the paragraph of the aforementioned "(a) actual measuring process of front & back length-size (X)". Then, in FIG. 10, there is shown the distance (that is, distance between the projection portion 106 of the left side cheek-bone and the projection portion 107 of the right side cheek-bone) in which the right & left front-cheek width-size ($L_1$) such as described above should be actually measured. Therefore, this right & left front-cheek width-size ($L_1$) means the right & left width-size from the region consisting of the front end portion and the vicinity thereof of the upper portion of the left side cheek portion within the head portion 94 of the helmet wearer 93 up to the region consisting of the front end portion and the vicinity thereof of the upper portion of the right side cheek portion. In other words, aforesaid right & left front-cheek width-size ($L_1$) means substantially the maximum right & left width-size of the head portion 94 at the lower side portion from the eyes on both the right & left sides within the head portion 94.

(e) Actual Measuring Process of Right & Left Back-Cheek Width-Size ($L_2$)

Next, when explaining an actual measuring process of the right & left back-cheek width-size ($L_2$), which is shown in FIG. 10, the head size measuring tool 1 is set on the head portion 94 by similarly employing the process described in the previous paragraph (that is, paragraph of "(d) Actual Measuring Process of Right & Left Front-Cheek Width-Size ($L_1$)"). In this case, the head size measuring tool 1 is set on the head portion 94 such that the distance between the pair of side plate portions 6, 23 will correspond to the length (that is, right & left back-cheek width-size ($L_2$) in FIG. 10) which is from the region 113 consisting of the portion and the vicinity thereof (see FIG. 6) which is slightly in front of the lower end of a left side earlobe 111 (see FIG. 6) within the left side cheek portion of the head portion 94 (that is, from the region consisting of the portion and the vicinity thereof at the left side back-cheek and from the portion on a little bit lower side compared with the left side tip portion of the mandible bone, which is all the same hereinafter) up to the region 114 consisting of the portion and the vicinity thereof which are slightly in front of the lower end of the a right side earlobe 112 within the right side cheek portion of the head portion 94 (that is, up to the region consisting of the right side back-cheek portion and the vicinity thereof). Then, it is preferable for each of the regions consisting of aforesaid left and right side back-cheek portions and their vicinities to be included in the region to be surrounded by a virtual circle having a radius of 2 cm centering around a second spot further on the 2 cm lower side from a first spot on the 3 cm front side from the center of the outside end of an external auditory canal of the left ear 102 or the right ear 103, and it is more preferably to be included in the region to be surrounded by a virtual circle having a radius of 1 cm centering around aforesaid second spot.

Also in a case mentioned above, it is enough if the relative slide and fixation of the second measuring tool piece 3 with respect to the first measuring tool piece 2 is to be carried out similarly as that described in the previous paragraph (that is, paragraph of "(d) Actual Measuring Process of Right & Left Front-Cheek Width-Size ($L_1$)"). Then, in FIG. 10, there is shown the distance (that is, distance between a region 113 consisting of a portion and the vicinity thereof on the slightly front side from the left side earlobe 111 within the left side cheek portion, and a region 114 consisting of a portion and the vicinity thereof on the slightly front side from the right side earlobe 112 within the right side cheek portion) in which the right & left back-cheek width-size ($L_2$) such as described above should be actually measured. It should be noted on an occasion of the actual measurement of the right & left back-cheek width-size ($L_2$) that it is enough if aforesaid actual measurement is carried out, in a state at the time of the actual measurement of the right & left front-cheek width-size ($L_1$), after moving the upper plate portion 5 side of the first measuring tool piece 2 substantially toward the lower side and after inclining the side plate portion 6. If doing like this, the aforementioned projection portion of the cheek-bone does not become an obstacle for the actual measurement, so that it is possible to carry out aforesaid actual measurement easily.

3. Selection of Kind of Helmet Size and Kind of Pad Based on Actual Measurement Value of Head Size The front & back length-size (X), the right & left width-size (Y), the upper head height size (Z), the right & left front-cheek width-size ($L_1$) and the right & left cheek width-size ($L_2$), which were actually measured in the aforementioned second paragraph, are inputted sequentially into a computer such as a personal computer or the like (not shown and hereinafter, this is merely referred to as "personal computer") for every time point at which each size is actually measured, or can be inputted into the personal computer in a lump after the actual measurements of all these five kinds of sizes are finished. It should be noted that it is allowed for aforesaid personal computer to be a personal computer in which necessary programs are stored beforehand or to be a personal computer which can utilize aforesaid programs through a computer network such as internet or the like. It is allowed for such a personal computer to be a personal computer which is provided in a helmet sales dealer or to be a personal computer which the helmet wearer 93 possesses.

Figures 2A, 2B, 2C:
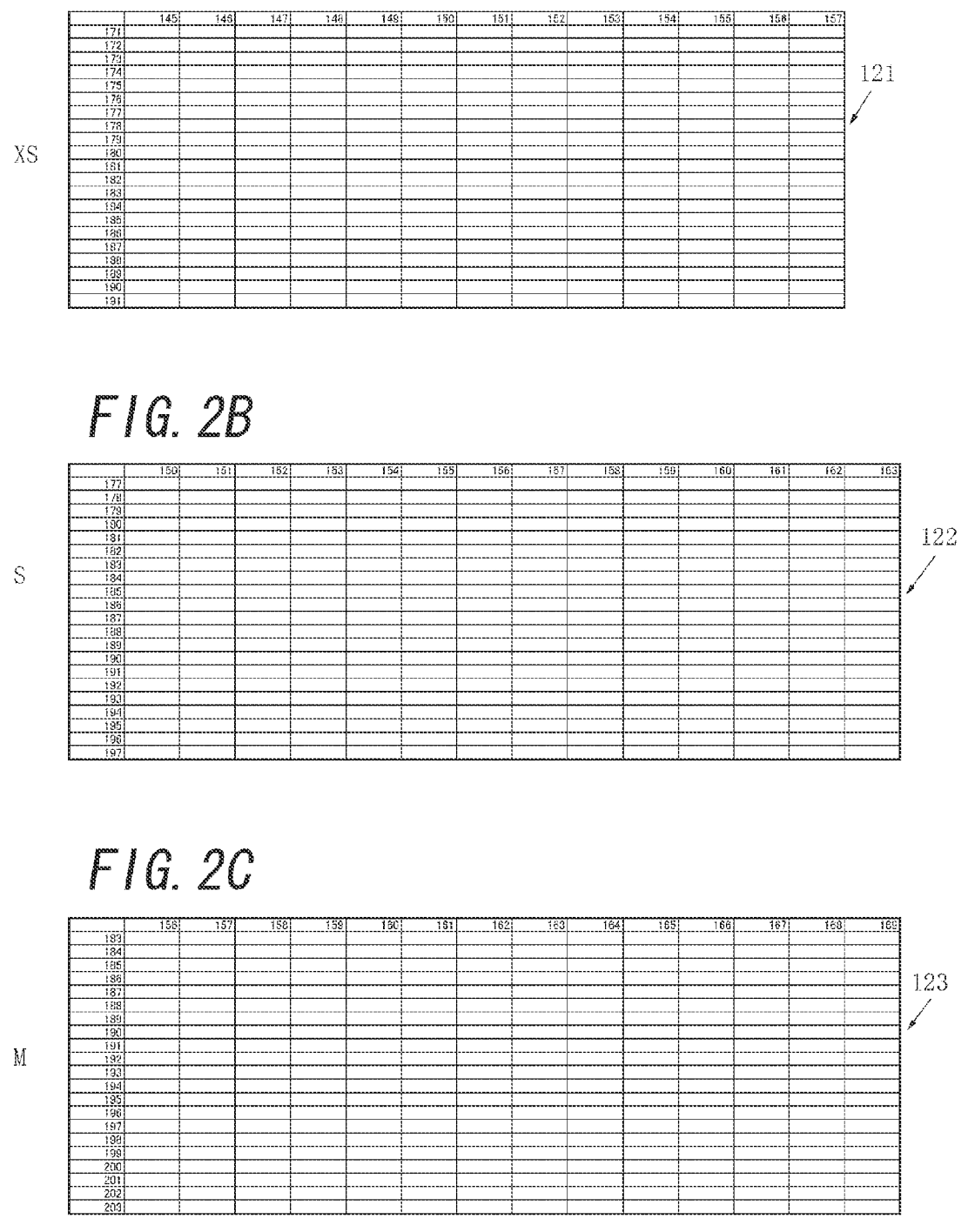

The picture screen on the personal computer when executing aforesaid program is shown as "helmet size diagnosis result" in FIG. 1. Then, in the region consisting of the left side end portion and the vicinity thereof in this FIG. 1, there can be displayed the actual measurement values of aforesaid five kinds of sizes. Also, when a personal-computer operator (for example, employee of a helmet sales dealer or the helmet wearer 93) operates an operation button 115 of "diagnosis" as operation means, aforesaid personal computer selects a fit-kind of the helmet 110 size by using aforesaid program based on the actual measurement values of the front & back length-size (X) and the right & left width-size (Y) within aforesaid five kinds of sizes. Then, this selection is carried out in accordance with the six kinds of adjustment data tables 121, 122, 123, 124, 125 and 126 (see FIG. 2A and FIG. 2F) included in aforesaid program.

The adjustment data table 121 within these six kinds of adjustment data tables is for an XS-size helmet 101. Then, the adjustment data table 122 is for an S-size helmet 101. Also, the adjustment data table 123 is for an M-size helmet 101. Further, the adjustment data table 124 is for an L-size helmet 101. Then, the adjustment data table 125 is for an XL-size helmet 101. Also, the adjustment data table 126 is for an XXL-size helmet 101. It should be noted in each of these six kinds of adjustment data tables 121 to 126 that the vertical axis indicates the front & back length-size (X). Then, the horizontal axis indicates the right & left width-size (Y). Also, the unit for the numerical values of the vertical axis and the horizontal axis in the six kinds of adjustment data table 121 to 126 is "mm".

Next, there will be explained examples with regard to selections of kinds of helmet sizes and pads based on actual measurement values of the head size while referring to drawings by being itemized into "(1) First Example" and "(2) Second and Third Examples".

(1) First Example

If 175 mm and 156 mm are inputted for the respective actual measurement values of the front & back length-size (X) and the right & left width-size (Y) into the personal computer by following the way as mentioned above, the XS-size corresponding to the adjustment data table 121, in which intersection points of these input values are included, is selected as the fitted size in accordance with the adjustment data tables 121 to 126 shown in FIG. 2A to FIG. 2F and is stored in the personal computer. Then, on the display column 128 on the upper side within the XS-size display column 127 on the picture screen of a personal computer shown in FIG. 1, there is displayed "XS-size". Also, for respective items of a display column 129 on the lower side within the XS-size display column 127, there are displayed, for example, items such as described as the following items (a) to (e):

(a) item of center pad "XS5",
(b) item of front and back "front/1+hard1 back/1+hard2 pad-addition",
(c) item of right & left "(blank column)",
(d) item of head-top portion "(blank column)", and
(e) item of cheek pad "(blank column)".

The "XS5" displayed in the item described as aforesaid item (a) within the lower side display column 129 in FIG. 1 means a kind of the center pad 131 (see FIG. 13) which fits the actual measurement values of the front & back length-size (X) and the right & left width-size (Y). Then, in the exemplified embodiment shown in the drawing, it is configured such that any one within three kinds of center pads 131 can be selected for every helmet 101 having each size within the helmets having six kinds of sizes. Therefore, for the XS-size center pad 131, there exist three kinds, that is, XS13, XS9 and XS5. Then, for the helmet 101 of the standard specification within the XS-sizes, a center pad 131 of XS9 is to be used. In this case, the kind of the center pad 131 is not displayed in the item described as aforesaid item (a), so that the item described as aforesaid item (a) becomes a blank column. It should be noted that "13", "9" and "5", which are numerical values following aforesaid XS, respectively mean differences in thickness of the center pad 131. Also, in this specification, the word "pad" such as the center pad 131 or the like means an interior pad which is disposed on the inside or the like of an impact absorption liner 139.

The term "front/1+hard1 back/1+hard2 pad-addition" displayed in the item described as aforesaid item (b) within the lower side display column 129 in FIG. 1 means, as shown in FIG. 15, instructions for adjusting the respective thicknesses of the front side portion 132 and the back side portion 133 of the center pad 131 which is selected in the item described as aforesaid item (a). Then, the term "1+hard1" following the term "front/" inside aforesaid display means that one piece of the front side additional pad 134 according to a standard specification and one piece of the front side additional pad 134 according to a harder specification are disposed at the front side portion 132 of the center pad 131. Also, the term "1+hard2" following the term "back/" inside aforesaid display means that one piece of the back side additional pad 135 according to a standard specification and two pieces of the back side additional pad 135 according to a harder specification are disposed at the back side portion 133 of the center pad 131. It should be noted that in a case in which the above-mentioned and after-mentioned additional pads are disposed by being faced to the center pad 131, the additional pads are generally disposed on the outside surface of the center pad 131 (in other words, between the center pad 131 and the impact absorption liner 139 disposed on the inside of the outside shell 138). Then, these additional pads can be held and bonded on the outside surface of the center pad 131 by using a pressure-sensitive adhesive agent, an adhesive agent, a pressure-sensitive adhesive tape or the like.

Figure 13:
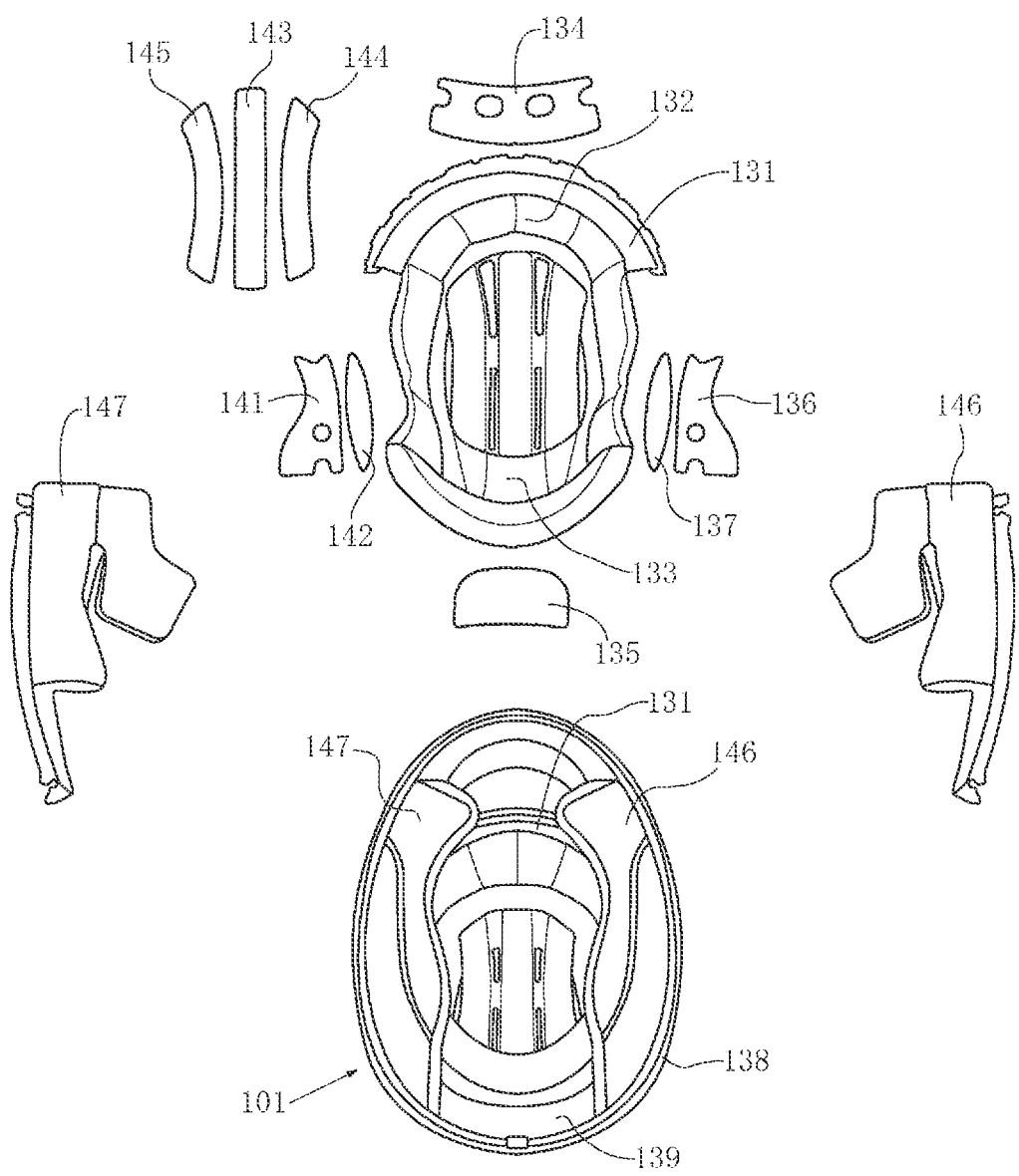
FIG. 13 is a view showing a bottom surface of a helmet which is attached with various kinds of interior pads based on the result of the helmet size diagnosis shown in FIG. 1, and various kinds of interior pads and various kinds of additional pads before attachment, which are to be attached to that helmet respectively.

On the picture screen of a personal computer shown in FIG. 1, there can be also displayed, as shown in FIG. 2A to FIG. 2F, S-size, M-size, L-size, XL-size and XXL-size display columns 127 similarly as in case of the XS-size display column 127. The "(blank column)" displayed in the item described as aforesaid item (c) within the lower side display column 129 in FIG. 1 means that the adjustment of the right & left width-size is unnecessary in the relation between the actual measurement value of the right & left width-size (Y) and the center pad 131 of "XS5" which is selected such as described above. If the adjustment of the right & left width-size is necessary, there will be displayed "right & left one set pad addition" with regard to the left and right side additional pads. It should be noted also with regard to the adjustment of this right & left width-size that there exist the left and right side additional pads of the standard specification and the left and right side additional pads of the harder specification. It is allowed for the additional pad of such a harder specification to be a pad whose thickness is thin compared with that of the additional pad of the standard specification. Then, one set within aforesaid one set pads means, as shown in FIG. 13, a set which is composed of a first left side additional pad 136, a second left side additional pad 137, a first right side additional pad 141 and a second right side additional pad 142. Also, each of the first left side additional pad 136 and the first right side additional pad 141 is overlapped with the center pad 131 in a state of being disposed on the lower side (in other words, front side in the drawing of FIG. 13) compared with each of the second left side additional pad 138 and the second right side additional pad 142.

The "(blank column)" displayed in the item described as aforesaid item (d) within the lower side display column 129 in FIG. 1 means that it is unclear whether the adjustment by additional pads 143, 144, 145 for the head-top portion with regard to the region consisting of the head-top portion of the center pad 131 and the vicinity thereof is necessary or unnecessary. Then, in a case in which the actual measurement value of the aforementioned upper head height size (Z) is inputted into the personal computer, if the adjustment by the additional pads 143 to 145 for the head-top portion is necessary in the relation between the kinds of the center pad 131 described in the aforementioned item (a) and the actual measurement value of the upper head height size (Z), a display such as "one pad addition" or the like is carried out on the item of the head-top portion described in the aforementioned item (d).

Figure 4:
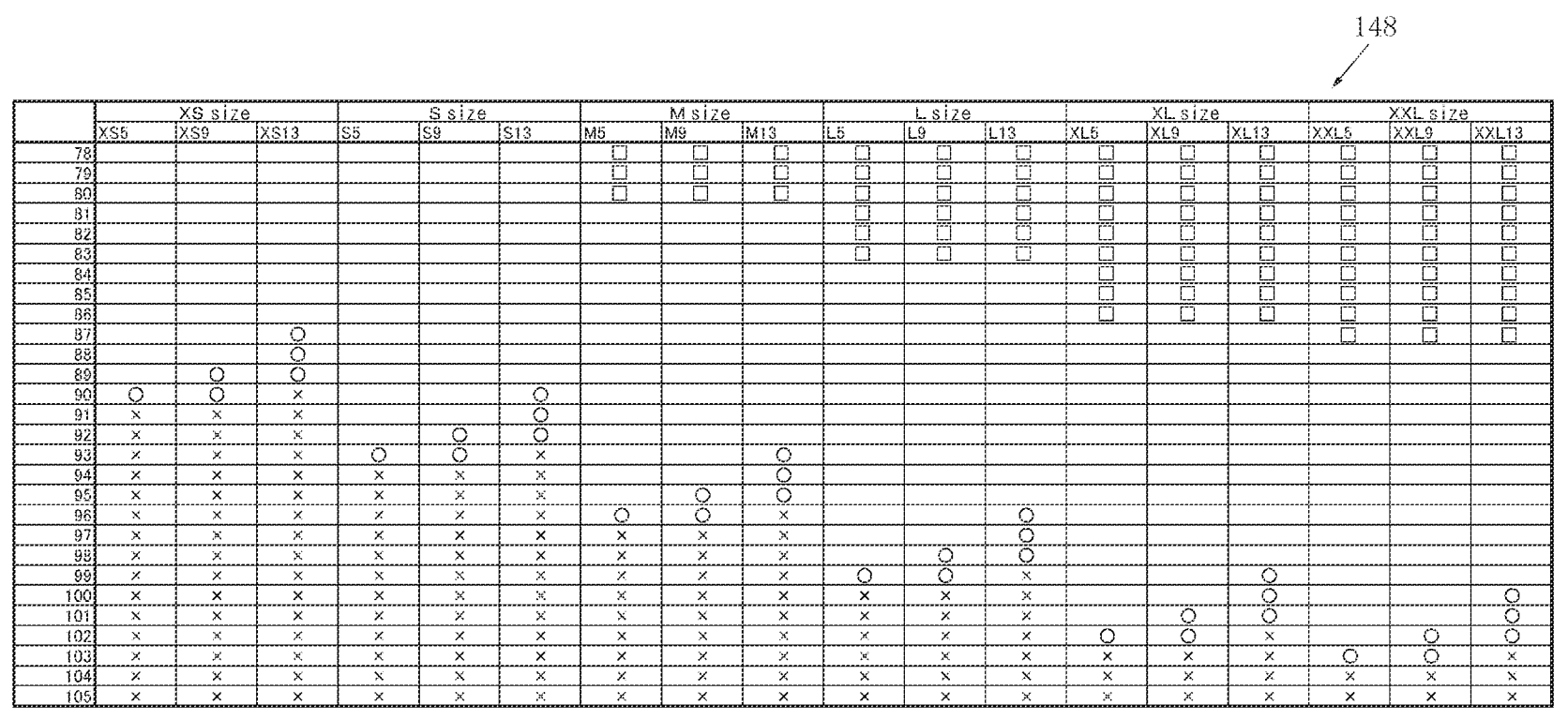

Specifically, it is assumed that "89 mm" is inputted as the actual measurement value of the upper head height size (Z) into the personal computer by the procedure mentioned above. On the other hand, in case of this first example, the XS-size is selected for the kind of the helmet size and concurrently, the "XS5" is selected for the kind of the center pad 131. For this reason, according to an adjustment data table 148 shown in FIG. 4, it is possible to obtain height adjustment information described in the intersection point between "XS5 (horizontal axis)" and "89 mm (vertical axis)". The height adjustment information in this case indicates "one pad addition", so that this means that the additional pads 143 to 145 for the head-top portion are to be added. It should be noted in FIG. 4 that the blank column in aforesaid intersection point means that there is described pad-addition information such as "one pad addition" or the like. Then, a mark "○" means that there is no need to add the additional pads 143 to 145. Also, a mark "□" means that the size adjustment is substantially impossible even if adding the additional pads 143 to 145 because the helmet 101 size is too large. Further, a mark "x" means that the size adjustment is impossible because the helmet 101 size is too small.

As described with regard to aforesaid mark "○", if the size adjustment such as described above is unnecessary, the item of the head-top portion described in aforesaid item (d) within the lower side display column 129 in FIG. 1 is subsequently maintained to be that "(blank column)". Further, when the display such as "one pad addition" or the like is carried out as described above, the center additional pad 143 for the head-top portion, the left side additional pad 144 for the head-top portion and the right side additional pad 145 for the head-top portion, which are shown in FIG. 13 respectively, are disposed on the outside surface of the center pad 131 in a state shown in FIG. 13.

The "(blank column)" which is displayed in the item described as aforesaid item (e) within the lower side display column 129 in FIG. 1 means that it is unclear about which kind of combination within the all combinations, in which there exist three kinds for each of the left side cheek pad 146 and the right side cheek pad 147, is to be selected and is to be used for the helmet 101. Specifically, there exist first, second and third left side cheek pads 146 whose thicknesses or the like are mutually different, and there exist first, second and third right side cheek pads 147 whose thicknesses or the like are mutually different. Then, in case of the first selection, there are selected the first left side cheek pad 146 and the first right side cheek pad 147 which may be constituted symmetrically for the right & left direction with respect to this first left side cheek pad 146. Also, in case of the second selection, there are selected the second left side cheek pad 146 and the second right side cheek pad 147 which may be constituted symmetrically for the right & left direction with respect to this second left side cheek pad 146. Further, in case of the third selection, there are selected the third left side cheek pad 146 and the third right side cheek pad 147 which may be constituted symmetrically for the right & left direction with respect to this third left side cheek pad 146.

In a case in which the actual measurement values of the aforementioned right & left front-cheek width-size ($L_1$) and the aforementioned right & left back-cheek width-size ($L_2$) are inputted into the personal computer respectively, any one of aforesaid first to third selections is carried out in the relation between the kind of the center pad 131 described in the aforementioned item (a) and each of the actual measurement values of the aforementioned right & left front-cheek width-size ($L_1$) and the aforementioned right & left back-cheek width-size ($L_2$). Then, in a case in which aforesaid selection result expresses aforesaid first selection, there is displayed "31" in the item of the cheek pad described as aforesaid item (e) within the lower side display column 129 in FIG. 1. Also, in a case in which aforesaid selection result expresses aforesaid third selection, there is displayed "39" in the item of cheek pad described as aforesaid item (e). Further, in a case in which aforesaid selection result expresses aforesaid second selection, the item of cheek pad described in the aforementioned item (e) is maintained continuously to be that "(blank column)".

When explaining specifically with regard to aforesaid first to third selections relating to the left side and right side cheek pads 146, 147 based on FIG. 5A to FIG. 5F hereinafter, these first to third selections are carried out in accordance with the six kinds of selection data tables 151, 152, 153, 154, 155 and 156 included in aforesaid program. The selection data table 151 within these six kinds of selection data tables is for the XS-size helmet 101. Then, the selection data table 152 is for the S-size helmet 101. Also, the selection data table 153 is for the M-size helmet 101. Further, the selection data table 154 is for the L-size helmet 101. Then, the selection data table 155 is for the XL-size helmet 101. Also, the selection data table 156 is for the XXL-size helmet 101. It should be noted in each of these six kinds of selection data tables 151 to 156 that the vertical axis shows the right & left front-cheek width-size ($L_1$). Then, the horizontal axis shows the right & left back-cheek width-size ($L_2$). Also, the unit for the numerical values of the vertical axis and the horizontal axis values in the six kinds of adjustment data tables 121 to 126 is "mm".

It is assumed that 148 mm and 127 mm were inputted as respective actual measurement values of the right & left front-cheek width-size ($L_1$) and the right & left back-cheek width-size ($L_2$) into the personal computer respectively by the procedure mentioned above. On the other hand, in case of this first example, the XS-size is selected as the kind of the helmet 101 size. Thus, in accordance with the XS-size selection data table 151 in FIG. 5A, the kind of the cheek pad described in the intersection point of these input values ("31" in this case) is selected as the kind of the left and right side cheek pads 146, 147, which is used for the above-mentioned XS-size helmet 101. Then, the kind of the cheek pad selected in this manner is displayed by the procedure mentioned above in the item of the cheek pad described as aforesaid item (e) within the lower side display column 129 in FIG. 1. Therefore, it is possible for the helmet 101 to use the left and right side cheek pads 146, 147, which belong to a kind referred to as "31".

(2) Second and Third Examples

Next, when explaining a second example, if 185 mm and 153 mm are inputted as respective actual measurement values of the front & back length-size (X) and the right & left width-size (Y) to the personal computer respectively by the procedure mentioned above, the XS-size and the S-size corresponding respectively to the two kinds of adjustment data tables 121, 122 in which the intersection point of these input values is included are selected in accordance with the adjustment data tables 121 to 126 shown in FIG. 2A to FIG. 2F as application sizes respectively, and they are stored in the personal computer. Therefore, in the display columns 128 on the upper side within the XS-size and S-size display columns 127 on the picture screen of a personal computer shown in FIG. 1, there are displayed "XS-size" and "S-size" respectively similarly as in case of the aforementioned first example. Also, for respective items of the display columns on the lower sides within the XS-size and S-size display columns, for example, similarly as in case of aforementioned first example, displays are performed such as described in the aforementioned items (a) to (e). Therefore, it is enough if either one of the XS-size and the S-size is selected according to wishes or the like of the helmet wearer and thereafter, the selection of the kind of the pad and the adjustment work of the helmet size are carried out respectively based on the pad information described in these items (a) to (e) by doing similarly as in the aforementioned first example.

Next, when explaining a third example, if 188 mm and 156 mm are inputted as the respective actual measurement values of the front & back length-size (X) and the right & left width-size (Y) to the personal computer respectively by the procedure mentioned above, the XS-size, the S-size and the M-size corresponding respectively to the three kinds of adjustment data tables 121, 122, 123 in which the intersection point of these input values is included are selected in accordance with the adjustment data tables 121 to 126 shown in FIG. 2A to FIG. 2F as application sizes respectively, and they are stored in the personal computer. Therefore, in the display column 128 on the upper side within the XS-size, S-size and M-size display columns 127 on the picture screen of a personal computer shown in FIG. 1, there are displayed the "XS-size", the "S-size" and the "M-size" respectively. Also, for respective items of the display columns on the lower sides within the XS-size, S-size and M-size display columns, for example, similarly as in case of aforementioned first and second examples, displays are performed such as described in the aforementioned items (a) to (e). Therefore, it is enough if any one of the XS-size, the S-size and the M-size is selected according to wishes or the like of the helmet wearer and thereafter, the selection of the kind of the pad and the adjustment work of the helmet size are carried out based on the pad information described in these items (a) to (e) by doing similarly as in the aforementioned first and second examples.

Figure 3:
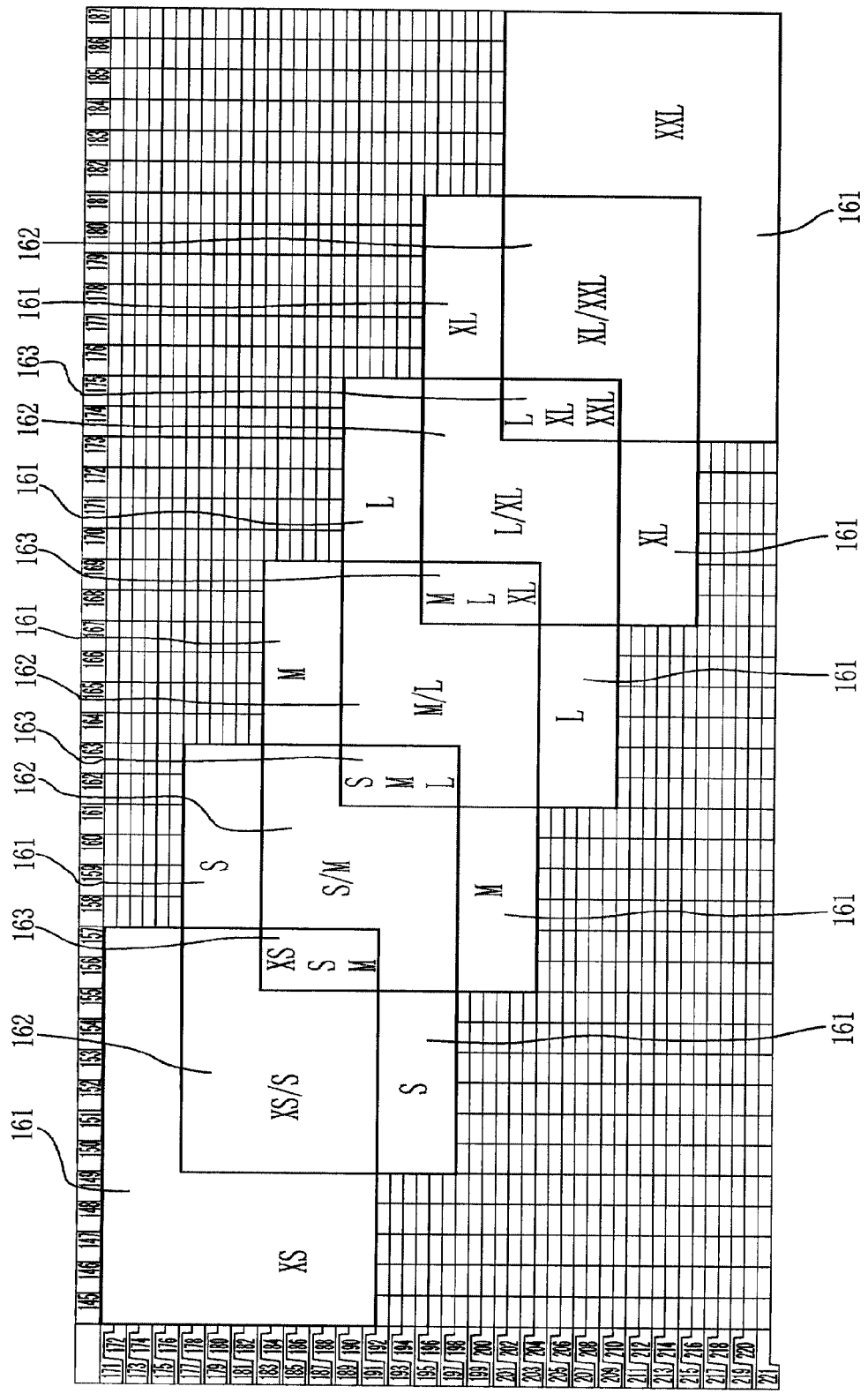
FIG. 3 is a schematic virtual adjustment data table showing the adjustment data tables shown in FIG. 2A to FIG. 2F by a single table in a lump.
Figure 5A:
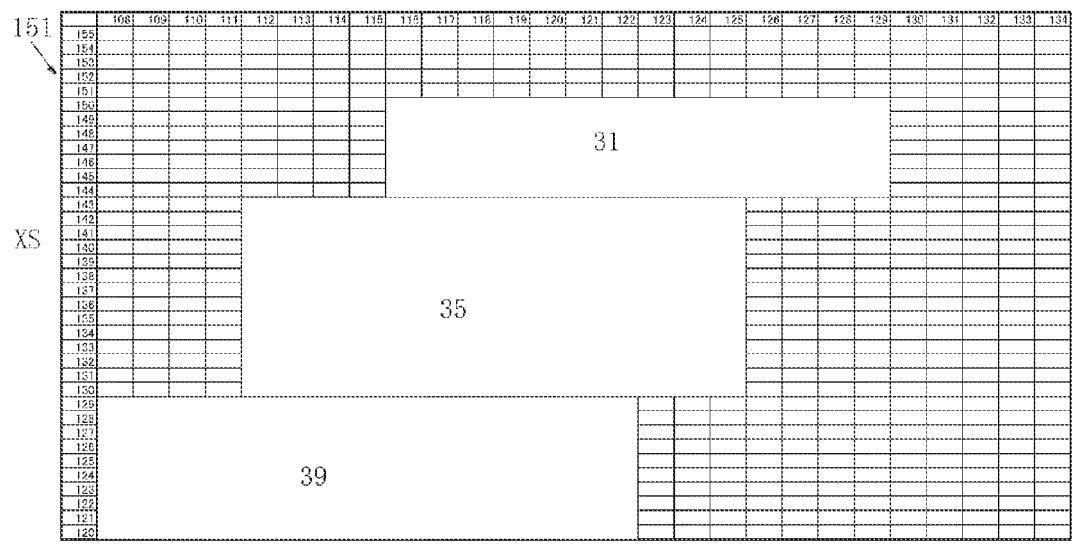
FIG. 5A is a schematic adjustment data table of an XS-size relating to the right & left front-cheek width-size and the right & left back-cheek width-size, which is for being displayed in the display column of the diagnosis result shown in FIG. 1.
Figure 5B:
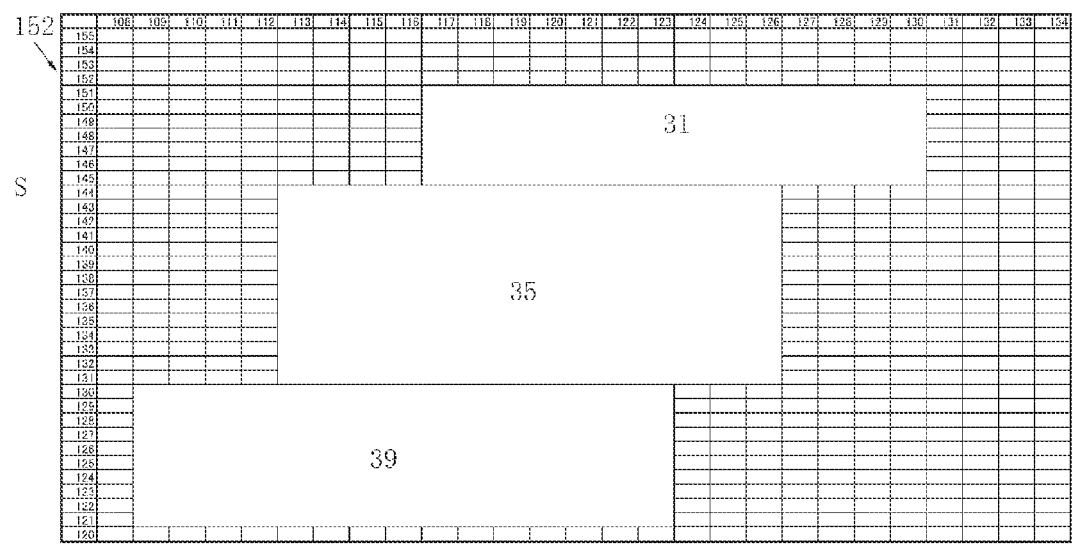
FIG. 5B is a schematic adjustment data table of an S-size relating to the right & left front-cheek width-size and the right & left back-cheek width-size, which is for being displayed in the display column of the diagnosis result shown in FIG. 1.
Figure 5C:
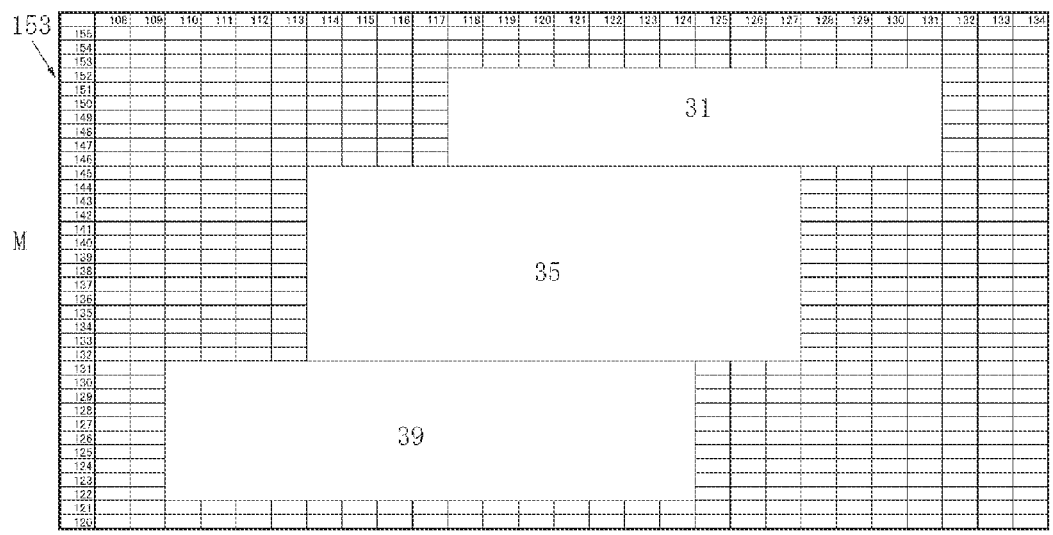
FIG. 5C is a schematic adjustment data table of an M-size relating to the right & left front-cheek width-size and the right & left back-cheek width-size, which is for being displayed in the display column of the diagnosis result shown in FIG. 1.
Figure 5D:
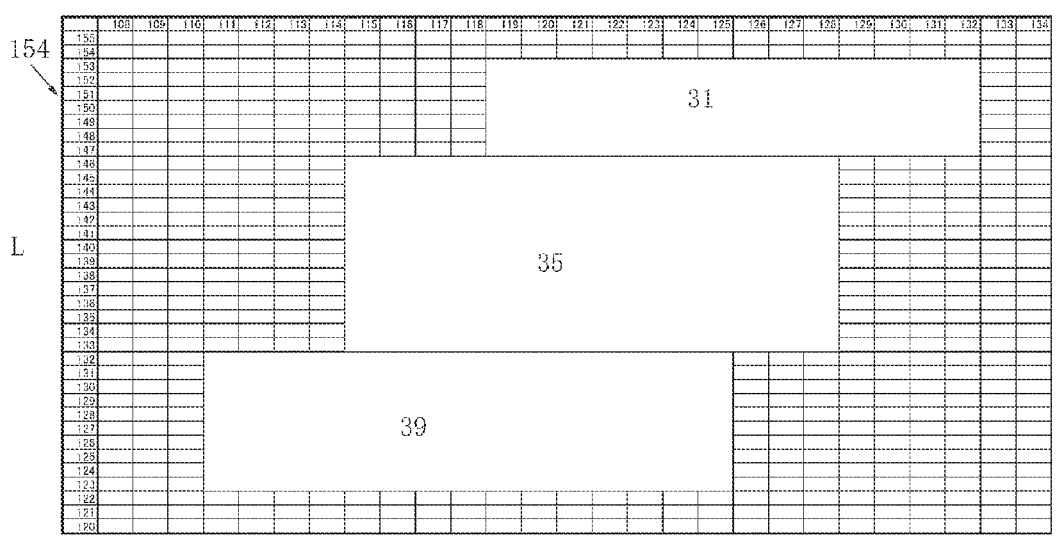
FIG. 5D is a schematic adjustment data table of an L-size relating to the right & left front-cheek width-size and the right & left back-cheek width-size, which is for being displayed in the display column of the diagnosis result shown in FIG. 1.

In FIG. 3, there is shown a state in which plural kinds of application sizes are overlapped mutually such as in case of the second and third examples. Then, within the respective regions surrounded by outline frames in this FIG. 3, the regions having only one kind of application size (specifically, "XS", "S", "M", "L", "XL" and "XXL") are applied with reference numerals 161. Also, the regions having two kinds of application sizes (specifically, "XS and S", "S and M", "M and L", "L and XL" and "XL and XXL") are applied with reference numerals 162. Further, the regions having three kinds of application sizes (specifically, "XS, S and M", "S, M and L", "M, L and XL", "L, XL and XXL") are applied with reference numerals 163.

In aforesaid second and third examples, such as described above, the plural kinds of application sizes are selected and stored in the personal computer. Therefore, it is necessary for aforesaid measurer or the like to select any one of the application sizes from within these plural kinds of application sizes. Therefore, it is preferable to display the application size to be recommended on the picture screen of a personal computer, which is shown in FIG. 1, such that this selection can be carried out comparatively easily. It should be noted that generally speaking, it is allowed for the application size to be recommended to be a size within the plural kinds of application sizes in which the adjustment work of the helmet size is comparatively simple. Therefore, in the exemplified embodiment shown in the drawing, there is employed a configuration in which the personal computer will detect an application size which should be recommended most within the plural kinds of application sizes. Then, there is employed a configuration in which the personal computer adds color, for example, to the whole display columns 128, 129 on the upper side and the lower side of the display column 127 of this detected application size with a color corresponding to the kind of helmet size. It should be noted in aforesaid third example that it is allowed to carry out aforesaid color addition with respect to both of the first application size to be recommended most and the second application size to be recommended secondarily.

Having described a specific preferred exemplified embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

For example, in the above-mentioned exemplified embodiment, the present invention is applied for a full-face helmet, but it is possible for the present invention to be applied to another kind of helmet such as a jet type one, a semi-jet type one or the like.

Also, in the above-mentioned exemplified embodiment, the left and right side additional pads for the side head portion are constituted by an additional pad set for the left side head portion, which is composed of the first left side additional pad 136 and the second left side additional pad 137, and an additional pad set for the right side head portion, which is composed of the first right side additional pad 141 and the second right side additional pad 142. Then, the additional pad for the head-top portion is constituted by an additional pad set for the head-top portion, which is composed of the center additional pad 143, the left side additional pad 144 and the right side additional pad 145. Further, the additional pad 134 on the front side and the additional pad 135 on the back side are constituted respectively by single additional pads. However, it is allowed for each of the left and right side additional pads for the side head portion and the additional pad for the head-top portion to be constituted by a single additional pad or by any other arbitrary number of additional pads. Then, it is allowed for each of the additional pads 134, 135 on the front side and the back side to be constituted by an arbitrary plural number of additional pads.

Also, in the above-mentioned exemplified embodiment, there was employed a configuration in which the additional pads are not disposed onto the respective left and right side cheek pads 146, 147. However, it is allowed, if required, to employ a configuration in which additional pads for the cheek pads are disposed also onto the respective left and the right side cheek pads 146, 147. In this case, similarly as in case of the additional pad 134 for the front head portion, it is possible, based on the size information and/or the pad information obtained from the personal computer, to carry out the selection of whether the adjustment by the additional pad for the cheek pad is necessary or unnecessary and/or to carry out the selection of what kind of adjustment by what kind of additional pad for the cheek pad is necessary.

Also, in the above-mentioned exemplified embodiment, the upper head height size (Z) means a height size from the composite region consisting of the region 108, 109 (which is on the upper side substantially by 2 cm from the upper ends of the respective base portions of the left ear 102 and the right ear 103 of the helmet wearer 93) and the vicinity thereof up to the region consisting of the head-top portion 105 and the vicinity thereof. Then, it is preferable for aforesaid "substantially 2 cm" to be in a range of 0 cm to 4 cm and more preferably, to be in a range of 1 cm to 3 cm. However, it is allowed for the upper head height size (Z) to mean a height size from a composite region consisting of the upper ends and their vicinities of the respective base portions of the left ear 102 and the right ear 103 up to a composite region consisting of the head-top portion 105 and the vicinity thereof, or to mean another height.

Further, in the above-mentioned exemplified embodiment, there was employed a configuration in which an employee of a helmet sales store, a helmet wearer or the like can adjust the helmet size. However, it is also possible for the helmet wearer to order a helmet directly to a helmet maker or the like through a computer network by attaching actual measurement values of the head size (specifically, size information such as front & back length, right & left width, upper head height, right & left front-cheek width, right & left back-cheek width and the like of the head portion, which are described in the aforementioned items 2(a) to 2(e)) and other information (specifically, helmet size, various kinds of pad information or the like, which is shown in FIG. 1). In this case, it is enough if the helmet maker or the like delivers a size-adjusted helmet to the helmet wearer after carrying out the mounting work (that is, size adjustment work) of various kinds of pads if necessary such that the helmet will get an optimum size.

The invention claimed is:

1. A selection method of selecting a kind of size of a helmet and a shape of a pad comprising:
   a process for inputting a front & back length-size and a right & left width-size of a head portion of a helmet wearer as data respectively into a computer which can utilize a program necessary for the selection of the kind of said helmet size and the shape of said pad; and
   a process for respectively selecting the kind of said helmet size and the shape of said pad, which respectively fit said helmet wearer, by data-processing said front & back length-size and said right & left width-size by using said program, wherein there are further comprised:

a process for inputting the upper head height size of the head portion of said helmet wearer as data into said computer, and a process for selecting the shape of the pad in the region consisting of the head-top portion and the vicinity thereof, which fits said helmet wearer, by data-processing said upper head height size by using said program.

2. A selection method according to claim 1, wherein in the selection of the shape of the pad in the region consisting of said head-top portion and the vicinity thereof includes a selection of whether it is necessary or unnecessary to adjust the region consisting of the head-top portion and the vicinity thereof of the center pad by an additional pad for the head-top portion.

3. A selection method according to claim 1, further comprising:

a process for inputting a right & left front-cheek width-size of the head portion of said helmet wearer, wherein the right & left front-cheek width-size means the distance between the region consisting of a projection portion and the vicinity thereof of a left side cheek-bone of said head portion, and the region consisting of a projection portion and the vicinity thereof of a right side cheek-bone of said head portion, and a right & left back-cheek width-size respectively to said computer as data thereof, wherein the right & left back-cheek width-size means the distance between the region consisting of a portion and the vicinity thereof on the slightly front side from the lower end of a left side earlobe within the left side cheek portion of said head portion, and the region consisting of a portion and the vicinity thereof on the slightly front side from the lower end of a right side earlobe within the right side cheek portion of said head portion and a process for selecting a shape of the cheek pad fitting said helmet wearer by data-processing said right & left front-cheek width-size and said right & left back-cheek width-size by using said program.

4. A selection method according to claim 1, wherein said upper head height size is a height size, from a region on the upper side as much as a range of 0 cm to 4 cm from the upper ends of respective base portions of a left ear and a right ear of said head portion, up to a head-top portion.

5. A selection method according to claim 1, wherein said upper head height size is a height size, from a region on the upper side as much as a range of 1 cm to 3 cm from the upper ends of respective base portions of a left ear and a right ear of said head portion, up to a head-top portion.

6. A selection method according to claim 1, further comprising a process for respectively displaying the selected kind of said helmet size and the selected shape of said pad.

7. A selection method according to claim 1, wherein the selection of the shape of said pad fitting said helmet wearer includes a selection of whether or not it is necessary or unnecessary to employ the center pad adjustment by at least one additional pad within the front side additional pad, the back side additional pad, the left side additional pad and the right side additional pad.

8. A method of adjusting the size of a helmet by using the selection method according to claim 1, wherein at least one kind of additional pad is disposed on said center pad based on the shape of said selected pad.

9. A head size measuring tool which is used in the selection method according to claim 1 and which can measure the front & back length-size and the right & left width-size of the head portion of the helmet wearer comprising:

a first measuring tool piece and a second measuring tool piece which is reciprocatingly movable relatively with respect to the first measuring tool piece, wherein in the head size measuring tool in which it is constituted such that said front & back length-size can be measured by the relative reciprocating movement position of said second measuring tool piece with respect to said first measuring tool piece in a first abutting state in which said first measuring tool piece is abutted to a front side surface or a back side surface of said head portion and concurrently, said second measuring tool piece is abutted to the back side surface or the front side surface of said head portion, and it is constituted such that said right & left width-size can be measured by the relative reciprocating movement position of said second measuring tool piece with respect to said first measuring tool piece in a second abutting state in which said first measuring tool piece is abutted to a left side surface or a right side surface of said head portion and concurrently, said second measuring tool piece is abutted to the right side surface or the left side surface of said head portion, wherein there is comprised a third measuring tool piece which is reciprocatingly movable relatively with respect to said first or second measuring tool piece; and it is constituted such that said upper head height size can be measured by the relative reciprocating movement position of said third measuring tool piece with respect to said first or second measuring tool piece in a third abutting state in which said third measuring tool piece is abutted to the head-top portion of said head portion in said second abutting state of said first and second measuring tool pieces.

10. A head size measuring tool according to claim 9, wherein a first length scale is provided for one of said first and second measuring tool pieces, a first index corresponding to said first length scale is provided for the other of said first and second measuring tool pieces, a second length scale is provided for one of said first or second measuring tool piece and said third measuring tool piece, and a second index corresponding to said second length scale is provided for the other of said first or second measuring tool piece and said third measuring tool piece.

11. A head size measuring tool according to claim 9 comprising:

first fixation means which can fix said second measuring tool piece operably for the fixation release thereof with respect to said first measuring tool piece, and a second fixation means which can fix said third measuring tool piece operably for the fixation release thereof with respect to said first or second measuring tool piece.

12. A head size measuring tool according to claim 11, wherein each of said first fixation means and said second fixation means is a fixing screw.

13. A selection method of selecting a kind of size of a helmet and a shape of a pad comprising:

a process for inputting a front & back length-size and a right & left width-size of a head portion of a helmet wearer as data respectively into a computer which can utilize a program necessary for the selection of the kind of said helmet size and the shape of said pad; and a process for respectively selecting the kind of said helmet size and the shape of said pad, which respectively fit said helmet wearer, by data-processing said front & back length-size and said right & left width-size by using said program, wherein there are further comprised:

a process for inputting a right & left front-cheek width-size of the head portion of said helmet wearer, wherein the right & left front-cheek width-size means the distance between the region consisting of a projection portion and the vicinity thereof of a left side cheek-bone of said head portion, and the region consisting of a projection portion and the vicinity thereof of a right side cheek-bone of said head portion, and a right & left back-cheek width-size respectively to said computer as data thereof, wherein the right & left back-cheek width-size means the distance between the region consisting of a portion and the vicinity thereof on the slightly front side from the lower end of a left side earlobe within the left side cheek portion of said head portion, and the region consisting of a portion and the vicinity thereof on the slightly front side from the lower end of a right side earlobe within the right side cheek portion of said head portion and a process for selecting a shape of the cheek pad fitting said helmet wearer by data-processing said right & left front-cheek width-size and said right & left back-cheek width-size by using said program.

14. A selection method according to claim 13, wherein the selection of the shape of said cheek pad includes to select a cheek pad fitting said helmet wearer from within the plural kinds of cheek pads whose thicknesses are mutually different.

15. A selection method according to claim 13, further comprising a process for respectively displaying the selected kind of said helmet size and the selected shape of said pad.

16. A method of adjusting the size of a helmet by using the selection method according to claim 15, wherein at least one kind of additional pad is disposed on said center pad based on the shape of said selected pad.

17. A head size measuring tool which is used in the selection method according to claim 15 and which can measure the front & back length-size and the right & left width-size of the head portion of the helmet wearer comprising:

a first measuring tool piece and a second measuring tool piece which is reciprocatingly movable relatively with respect to the first measuring tool piece, wherein in the head size measuring tool in which it is constituted such that said front & back length-size can be measured by the relative reciprocating movement position of said second measuring tool piece with respect to said first measuring tool piece in a first abutting state in which said first measuring tool piece is abutted to a front side surface or a back side surface of said head portion and concurrently, said second measuring tool piece is abutted to the back side surface or the front side surface of said head portion, and it is constituted such that said right & left width-size can be measured by the relative reciprocating movement position of said second measuring tool piece with respect to said first measuring tool piece in a second abutting state in which said first measuring tool piece is abutted to a left side surface or a right side surface of said head portion and concurrently, said second measuring tool piece is abutted to the right side surface or the left side surface of said head portion, there is comprised a third measuring tool piece which is reciprocatingly movable relatively with respect to said first or second measuring tool piece; and it is constituted such that said upper head height size can be measured by the relative reciprocating movement position of said third measuring tool piece with respect to said first or second measuring tool piece in a third abutting state in which said third measuring tool piece is abutted to the head-top portion of said head portion in said second abutting state of said first and second measuring tool pieces.

18. A head size measuring tool according to claim 17, wherein a first length scale is provided for one of said first and second measuring tool pieces, a first index corresponding to said first length scale is provided for the other of said first and second measuring tool pieces, a second length scale is provided for one of said first or second measuring tool piece and said third measuring tool piece, and a second index corresponding to said second length scale is provided for the other of said first or second measuring tool piece and said third measuring tool piece.

19. A head size measuring tool according to claim 17 comprising: first fixation means which can fix said second measuring tool piece operably for the fixation release thereof with respect to said first measuring tool piece, and a second fixation means which can fix said third measuring tool piece operably for the fixation release thereof with respect to said first or second measuring tool piece.

20. A head size measuring tool according to claim 19, wherein each of said first fixation means and said second fixation means is a fixing screw.

21. A selection method according to claim 13, wherein the selection of the shape of said pad fitting said helmet wearer includes a selection of whether or not it is necessary or unnecessary to employ the center pad adjustment by at least one additional pad within the front side additional pad, the back side additional pad, the left side additional pad and the right side additional pad.

22. A method of adjusting the size by using the selection method according to claim 13, wherein any one kind of cheek pad within the plural kinds of cheek pads is disposed inside said helmet based on the shape of said selected cheek pad.

* * * * *